United States Patent [19] [11] 3,638,882
Turriere [45] Feb. 1, 1972

[54] THUNDERSTORM OBSERVATION SATELLITE

[72] Inventor: Jean Emile Turriere, Paris, France
[73] Assignee: International Standard Electric Corporation, New York, N.Y.
[22] Filed: Feb. 19, 1970
[21] Appl. No.: 12,791

Related U.S. Application Data

[63] Continuation-in-part of Ser. No. 712,102, Mar. 11, 1968, abandoned.

[30] Foreign Application Priority Data

Mar. 31, 1967 France....................................100914

[52] U.S. Cl..........................................244/1 SS, 250/220 M
[51] Int. Cl.............................................B64g 1/00
[58] Field of Search..................244/1 SS, 77, 1 SA; 250/209, 250/220 M; 356/140, 147

[56] References Cited

UNITED STATES PATENTS 3,493,765  2/1970   Kelly et al.........................244/1 SA X
3,244,889  4/1966   Preston et al...................250/220 M X
3,351,763  11/1967  Shwart............................250/220 M X
3,137,794  6/1964   Seward.............................244/1 SA X

OTHER PUBLICATIONS

B. N. Harden & V. A. W. Harrison; Satellite-borne Equipment for a Global Survey of Terrestrial Radio Noise; The Radio & Electronic Engineer; Mar. 1968; pp. 125– 133
R. A. Hand & D. Q. Wark; Physical Measurements from Meteorlogical Satellites, Astronautics & Aerospace Engineering; Apr. 1963; 85– 88.

Primary Examiner—Trygve M. Blix
Assistant Examiner—Jeffrey L. Forman
Attorney—C. Cornell Remsen, Jr., Walter J. Baum, Paul W. Hemminger, Charles L. Johnson, Jr., Philip M. Bolton, Isidore Togut, Edward Goldberg and Menotti U. Lombardi, Jr.

[57] ABSTRACT

This relates to equipment on board a spin-stabilized satellite for locating and counting lightning discharges. The discharges are detected by a plurality of $n \times n$ photocell matrices to deliver two quantized angles which define unambiguously the position of the discharge projected on the surface of the earth. The matrices effectively divide the earth surface into $2H \times 2H$ km. zones ($H$ being equal to the altitude of the satellite) centered along the subsatellite great circle and each zone is quantized into $n \times n$ quadrilaterals. The angle values are processed to obtain coordinate values defining the quadrilateral where the discharges occurred. The coordinate value are stored in the appropriate one of $n \times n$ portions of the appropriate one of a plurality of zone memory. Further processing allows discrimination between long and short discharges which information is stored in the appropriate one of the $n \times n$ portions of the proper memory during the time the quadrilateral corresponding to the memory portion was observed by the satellite. The content of the memories are sent to ground stations at regular intervals.

7 Claims, 36 Drawing Figures

Inventor
JEAN EMILE TURRIERE
By Alfred C. Hill
Agent

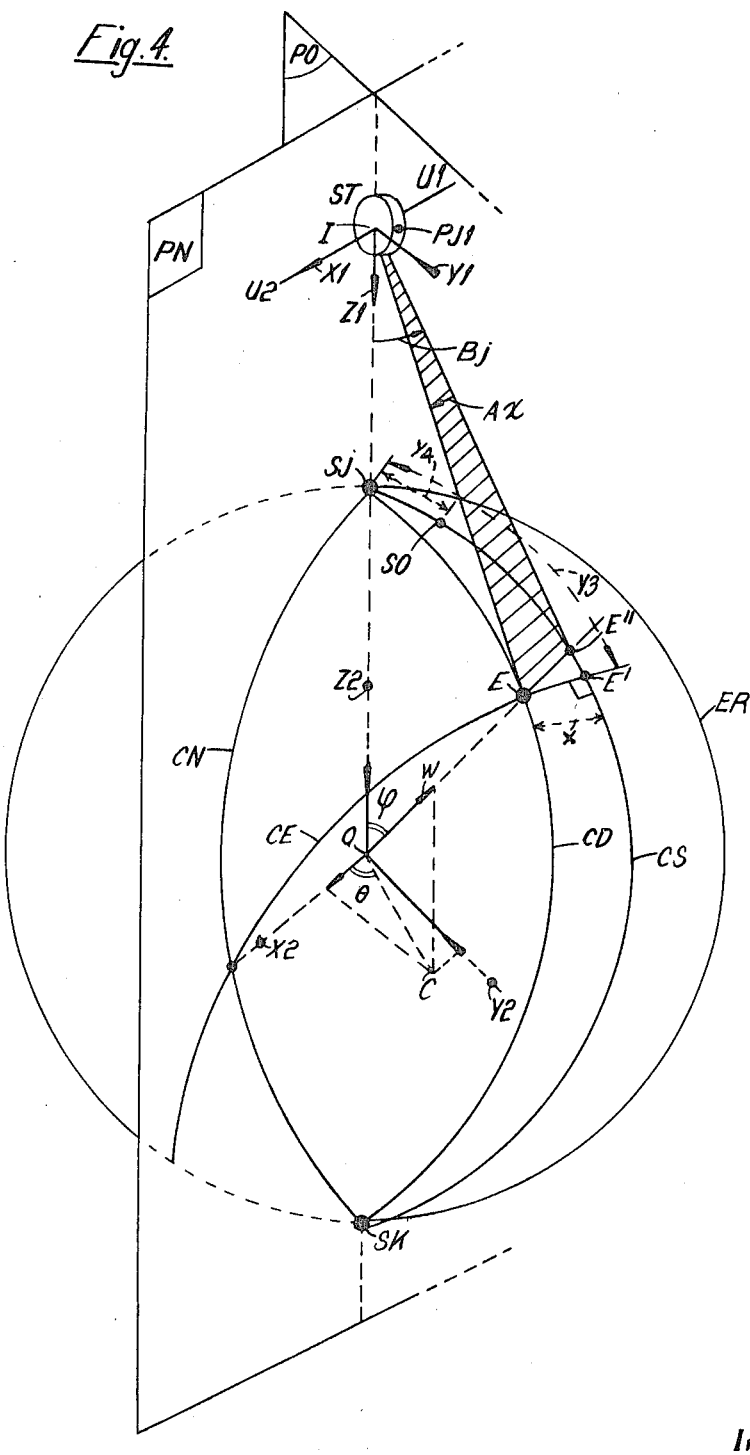

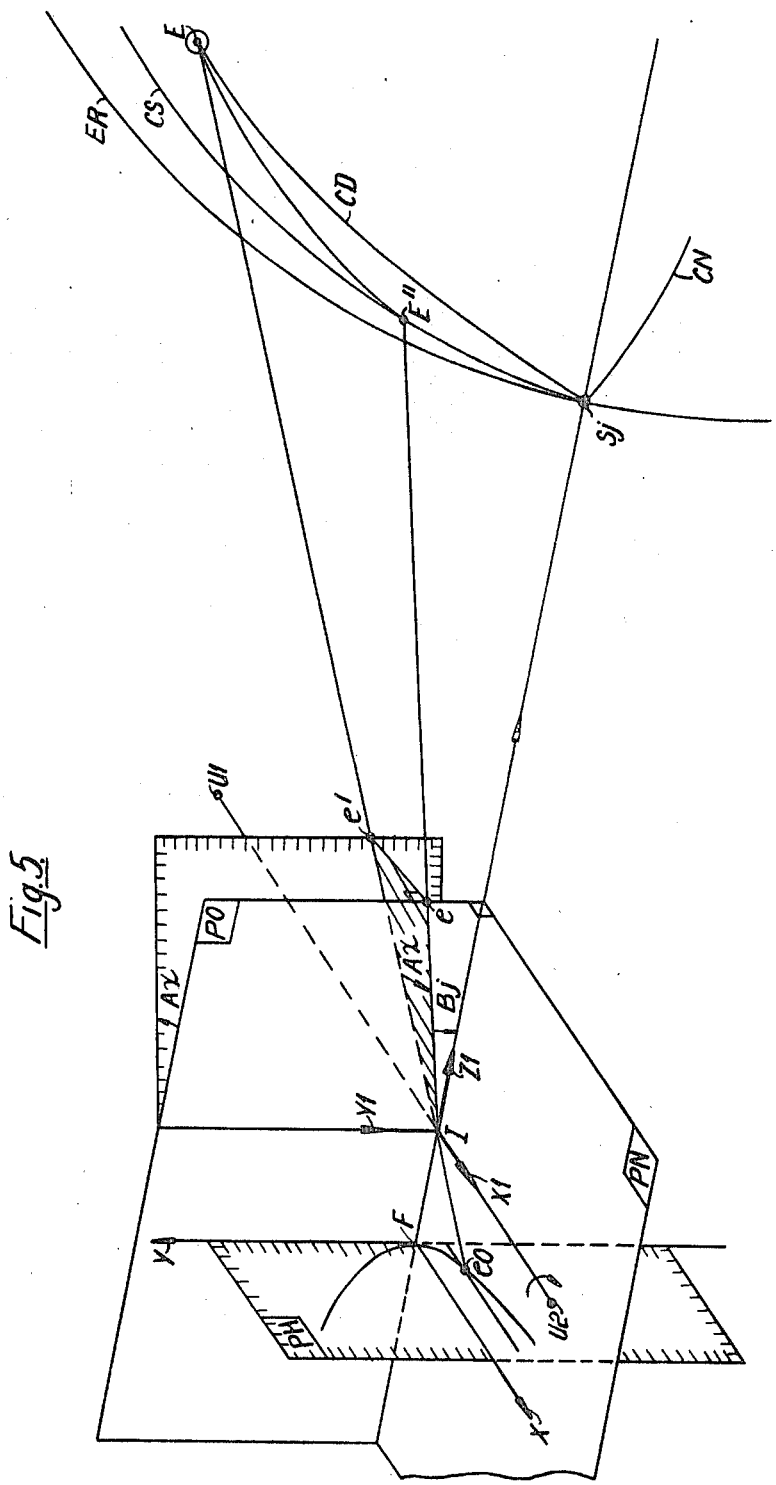

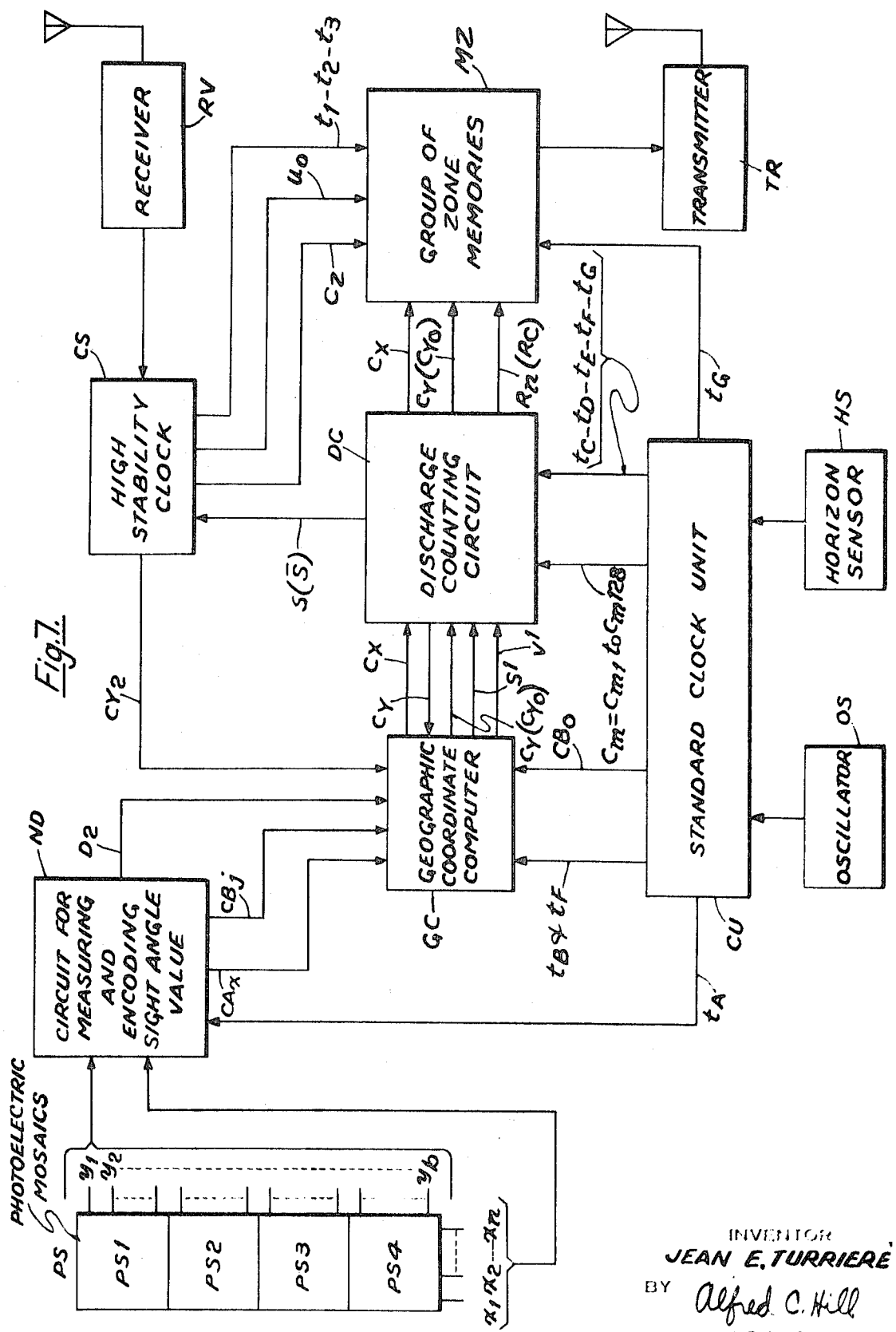

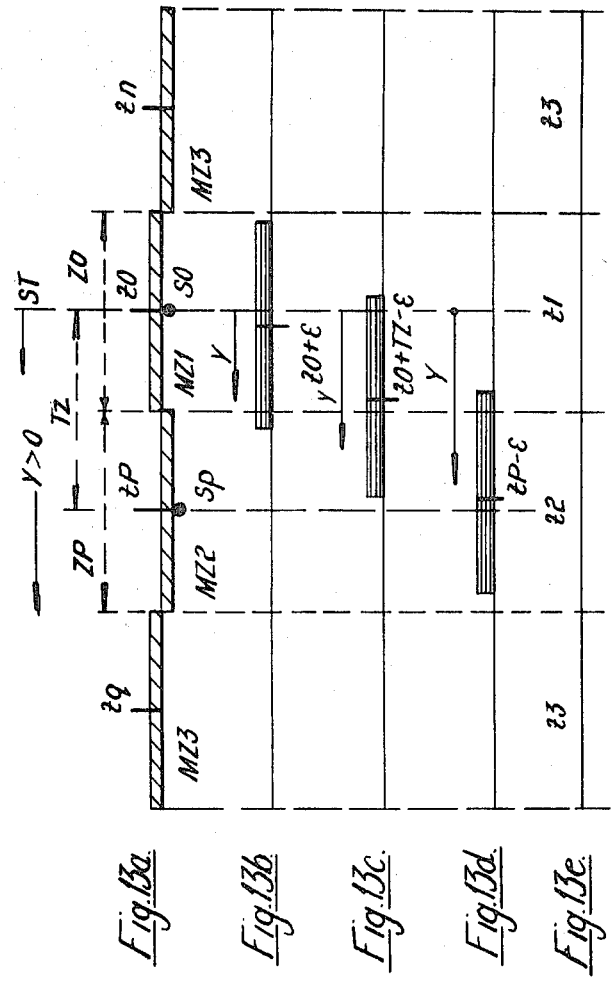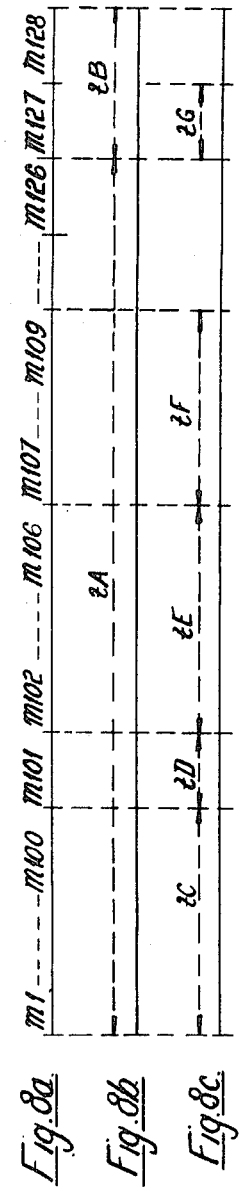

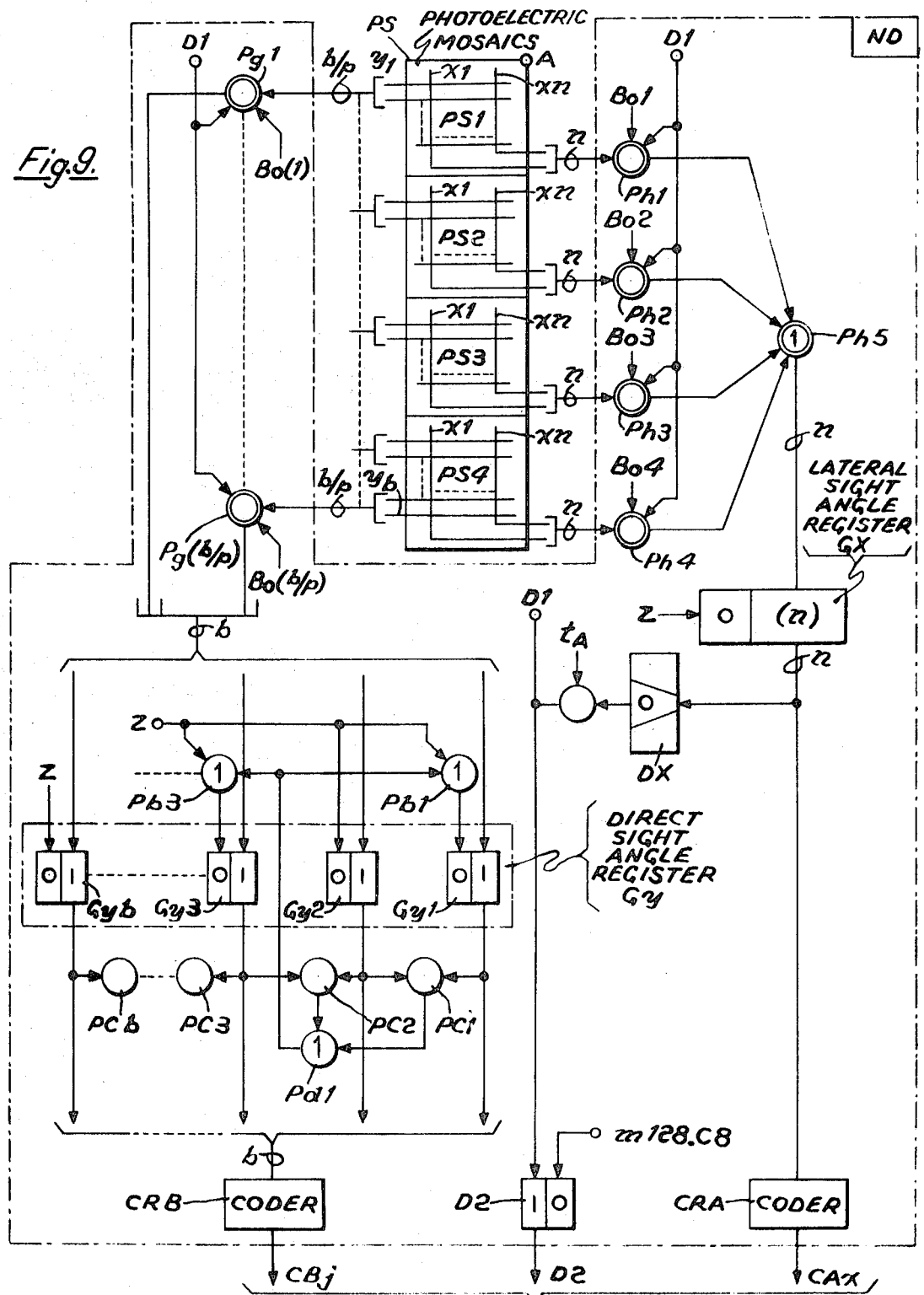

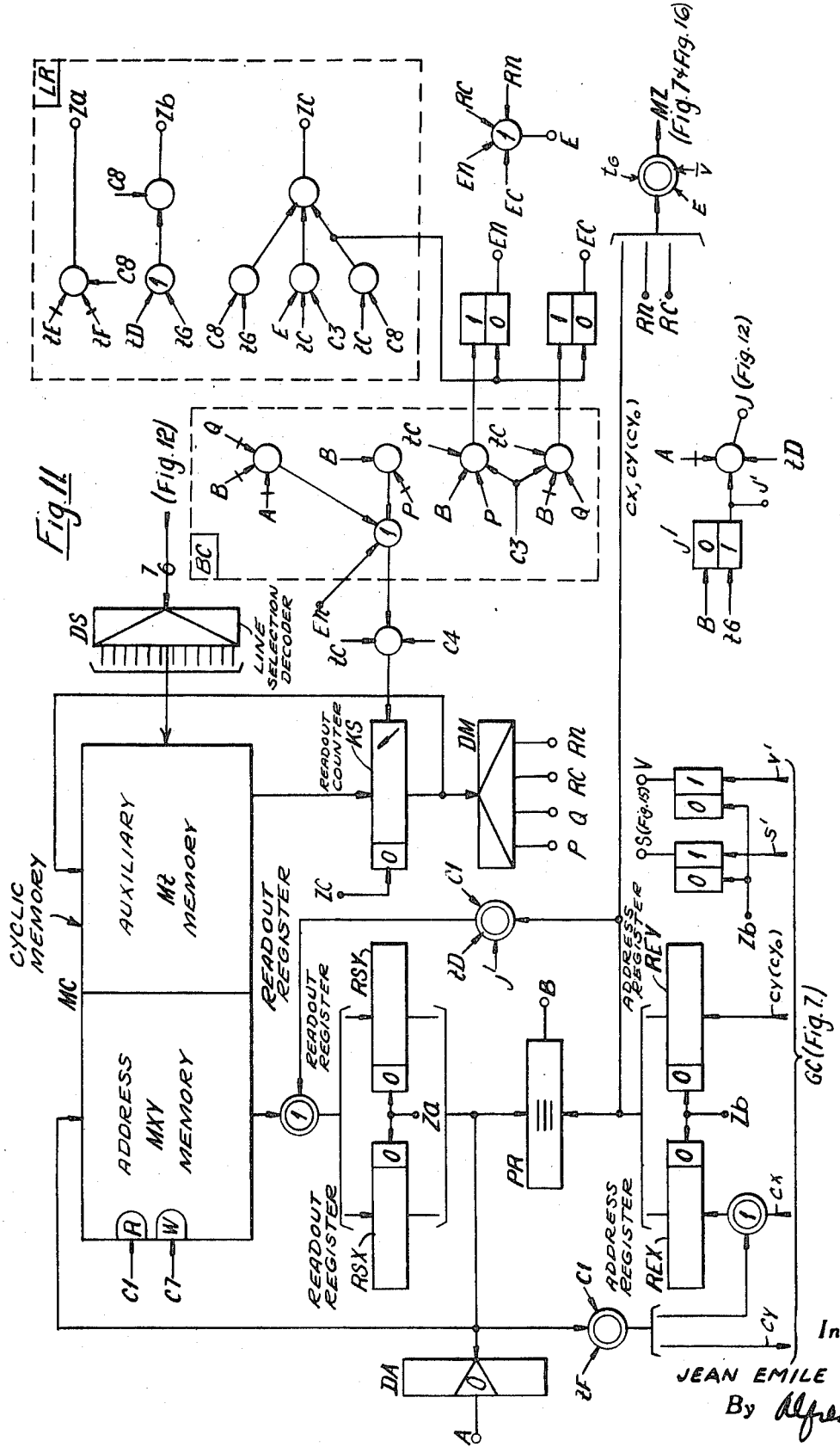

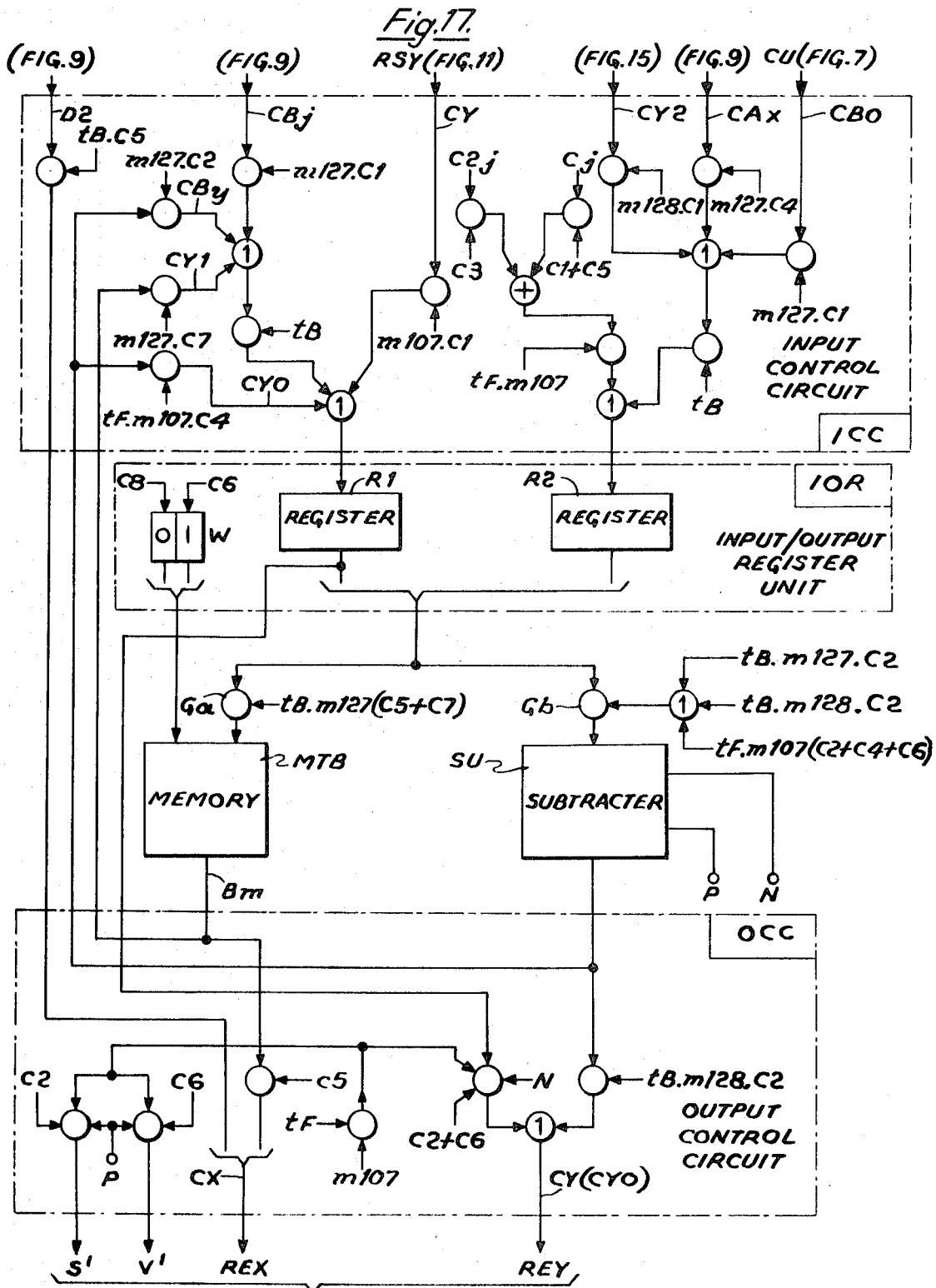

THUNDERSTORM OBSERVATION SATELLITE

CROSS-REFERENCE TO RELATED APPLICATION this is a continuation-in-part of copending application, Ser. No. 712,102, filed Mar. 11, 1968, and now abandoned.

BACKGROUND OF THE INVENTION

The present invention relates to a system for detecting, localizing and measuring the light phenomena occurring in the troposphere or on the earth surface with the help of a satellite wherein the observation is carried out by optoelectronic transducers constituted by photosensitive means, such as photoelectric cells.

Many processes are known to observe such phenomena and more specially to observe lightning occurring during thunderstorms. These processes can be classified into five categories:

1. Observation in the very low frequency band (1 to 30 kHz.): the "atmospherics" produced by the lightning have been studied for a long time by several specialized stations equipped with radiogoniometers, but their localization is obviously difficult. The "atmospherics" can also be detected by receiving stations placed in satellites, but their localization is not possible because of the peculiar conditions of propagation of the myriametric waves in the ionosphere.

2. Observation in the high very high frequency band (100 kHz. to several megahertz). Experiences of reception on earth in these frequency bands have been done (Book: "Physics of Lightning" page 134—Author: D. J. Malan—Editor: "The English University Press").

The very high frequency waves can also be received in satellites equipped with antennas designed for these frequencies. (Publication "Lightning Observations on Satellites"—Author: A. S. Dennis—Stanford Research Institute—Contract NASr 49 (18).) However, it is understood that such an antenna has an important size and must be permanently directed towards the earth.

3. Observation on a radar screen: By observing thunderstorms with the help of radar operating in the UHF band, real echoes can be obtained on the ionized trace of the lightning (Book: "Handbook of Geophysics"—Author: S. L. Valley—Editor: Mac Grew Hill—Apr. 1965). This process allows to localize the lightning, but the range is limited to that of the radar and important video equipments and are needed if any information is not to be lost.

4. Photographic observation: Thunderstorms and lightning can be photographed intermittently from the earth surface or from balloons, but the range is limited to a few tens of kilometers (Book: "Physics of Lightning" hereabove mentioned—page 9). This observation process is reserved to the spectral measurement of lightning (Article: "Lightning Spectroscopy-"—Author: M. A. Uman—IEEE Spectrum—Aug. 1966—page 102).

5. Observation from the earth surface with the help of photoelectric cell or a photomultiplicator tube provided with a narrow band optical filtering (Article: "Lightning Photography and Counting in Daylight"—Authors: L. Salanave and B. Brook—Journal of Geophysical Research—Mar. 15, 1965—page 1,285). This process presents the drawback that this narrow band filtering is really efficient only for a very reduced sight field, and that it can allow neither the observation nor the localization of lightning occurring in a large zone.

SUMMARY OF THE INVENTION

In the process according to the invention, the observation is made in an optical way with the help of optical-electrical transducers placed in a satellite, the filtering of the ambient light and of the other causes of interference being preferently carried out by electronic means.

The satellite, placed at a medium altitude, on a circular or quasicircular orbit is spin-stabilized and rotates around an axis perpendicular to the plane of the orbit. It is equipped with four plane "mosaics" each comprising $n \times n$ photoelectic cells. The aperture of the optical system associated with each mosaic is chosen in order to obtain sight angles of 90° in each direction. These mosaics are used to make a quantized measurement of the parameters necessary to localize the observed phenomena.

If the satellite is at a height $H$, a mosaic perpendicular to the vertical of the subsatellite point covers, on the tangent plane to the earth, a square surface with a side equal to $2H$. Because of the curvature of the earth, the corresponding zone on the earth has a greater surface. It has been chosen, as an example, to quantize the earth surface in quadrilaterals each side of which having a length equal to $2H/n$, that is, each zone of the earth is quantized, as the mosaic, into $n \times n$ quadrilaterals. Each of said quadrilaterals is localized, with the help of exact geographic coordinates, with respect to a reference quadrilateral centered on a point of the zone flown over by the satellite that will be called the origin point. This origin point is the center of the central quadrilateral of the zone if $n$ is an odd number.

This localization concerns the oblique projection, on the earth surface, of the phenomena in the troposphere, the satellite being taken as the pole of the projection. For light phenomena, such as lightning generated by thunderstorms, which occur at relatively low altitudes with respect to the altitude of the satellite, the above-mentioned oblique projection can be taken as the projection according to the vertical of the place, and in the contrary case, it would be possible to transform the oblique projection into a projection according to the vertical of the place by inserting corrections with regard to the altitude of the phenomena.

The divisions of the mosaic are made in order to obtain the quantized measure of two angles defining a point on the earth surface and this data is used to calculate the exact geographic coordinates of the earth quadrilateral containing this point with respect to the origin point. This information is then temporarily stored in a buffer memory and compared to the information received during a given period of time. From this comparison there is generated information on the duration of the light phenomena. (For example: long lightning $En$ or short lightning $Ec$.)

In addition, there is placed in the satellite, $z$ zone memories each comprising $n \times n = n^2$ addresses corresponding to the quadrilaterals of a zone, plus an address in which is written information characterizing the position of the origin point with respect to an earth reference point. If this information is set up for each passage over this point, it enables to obtain afterwards, by consulting the satellite orbiting information table, the exact coordinates of each origin point. Each address of a quadrilateral, selected from the computed coordinates, may store—in the case of the observation of thunderstorms—two pieces of information characterizing, respectively, the number of short duration lightning flashes and the number of long duration lightning flashes observed in this quadrilateral.

Then, at regular intervals, the contents of each zone memory is transmitted to ground where it is received, for example, by the network of APT (Automatic Picture Transmission) stations.

It is to be understood that this optical surveillance process allows the measurement of other parameters, such as, for example, the peak amplitude of the light pulses at given points (or at every point) covered by the mosaic.

In the process according to the invention, the localization of an earth point is made by a spin-stabilized satellite equipped with four photoelectric mosaics placed on its periphery. It is quite obvious that this operation can also be made with a "-Nimbus" type satellite stabilized along its three axis and comprising only one mosaic that is permanently directed towards the earth. However, the stabilization of such a satellite is a difficult operation and must be frequently corrected, which entails having fuel reserves on board.

Thus, the object of the present invention is to localize the light phenomena occurring in the troposphere or on the earth surface, and to measure some of their characteristics, the detection means being placed in a satellite.

The invention is characterized by the fact that the detection means of the light phenomena is constituted by four mosaics each equipped with $n \times n$ photoelectric cells regularly placed on the circumference of the satellite in the case where said satellite is stabilized by a rotary motion around an axis perpendicular to the plane of the orbit; that an optical system with an aperture of 90° is associated to each mosaic, said mosaic being placed in the focal plane of said optical system; and that the shape of the cells is such that each one represents an angle quantum having a value of $90°/n$, said mosaic allowing the measurement of the direct sight angle $Bj$ and of the lateral sight angle $Ax$ belonging to the direct sight triangle drawn from the center of the satellite. This triangle is perpendicular to the orbit plane and comprises the line of sight, the angle $Ax$ being the apex of this triangle and the angle $Bj$ being the angle made by the plane of this triangle with the plane perpendicular to the orbit plane. These angles being measured in a cartesian coordinate system $Fx1, Fy1$, where $F$ is the focus of an optical system associated with a mosaic.

Another characteristic of the present invention is the fact that, when a cell of the mosaic of coordinates $x, y$ detects a light phenomena in its sight range, information is registered in two flip-flops corresponding to the ordinate and to the abscissa of this cell, one of said flip-flops belonging to a lateral angle register and the other of said flip-flops belonging to a longitudinal angle register; and that this information is encoded to obtain the codes $CAx$ and $CBj$ of these angles expressed in an angle unit. In addition, a horizon sensor delivers, at any time, the code $CBo$ of the angle between the vertical and a reference point on the satellite surface; and that the angle value measured by the mosaic is corrected to obtain the real value $By=Bj-Bo$.

Another characteristic of the present invention is the fact that, if the great circle $CF$ which is orthogonal to the great subsatellite circle $CS$ and which passes through the point $E$ where the observed phenomenon has appeared is considered, the intersection point of these two circles—which is placed between the equatorial plane and the satellite—being referenced $E'$, a point is defined on the earth surface by its curvilinear ordinate $Y'$ measured, with respect to an origin point, on the circle $CS$ and by its curvilinear abscissa $X'$ that represents the length of the arc $EE'$; that the measure of the angles $Ax, Bj, Bo$ is made in a discontinuous way under the control of a signal $tA$ having a period of $t$ milliseconds and a duty cycle lower than 1; and that, during the remaining part of the period, or during the next period, there is calculated, with the parameters $Ax, Bj, Bo, H$ and $R$, the coordinates $X'$ and $Y'$, where $H$ is the height of the satellite and $R$ is the earth radius. The phase "duty cycle lower than 1" means that the duration of the signal $tA$ is shorter than the duration of its repetition period. For instance, a square wave (equal "on" and "off" durations) has a duty cycle of 0.5.

Another characteristic of the invention is the fact that the earth surface is divided into zones of $2H \times 2H$ km. (kilometers); that each zone is quantized into $n \times n$ quadrilaterals, $n$ being an odd number; that each quadrilateral is identified in cartesian curvilinear coordinates with respect to the center of the central quadrilateral or origin point; that a zone covers a surface smaller than that covered by a mosaic parallel to the plane tangent to the origin point; and that the coordinates $Y'$ and $X'$ expressed in length units are transformed into coordinates $Y$ and $X$ characterizing, in quantized units, the quadrilateral in which the phenomenon has appeared.

Another characteristic of the invention is the fact that the codes $CX, CY$ of the first light discharge sensed in this quadrilateral are stored on a line of a first cyclic memory; that, at each period of duration $t$, all the codes stored in this memory are compared to the codes of a discharge sensed during the preceding period; that, when there has been detected a light phenomenon, such as a short lightning (associated signal $Ec$), or a long lightning (associated signal $En$), its codes $CX, CY$ are written asynchronously in a second cyclic memory; that, when the codes are read in said second memory during the cyclic readout, this readout is blocked, when signal $Ec$ or $En$ is read; that the associated code $CY$ is examinated to know if its value is lower or higher than $(n-1)/2$; that in this last case, there is calculated $Y-(n-1/2)=Yo$; and that if $Yo>(n-1/2)$, the information $X$ and $Yo$ is discarded.

Another characteristic of the present invention is the fact that there are $Z$ zone memories selected in time succession in synchronism with the displacement of the satellite; that each memory comprises $n^2$ addresses selected by the codes $CX$ and $CY$ (or $CYo$), plus one address for registering a code $CZ$ characterizing the number of zones flown over by the satellite from a reference point on the earth surface, each of the $n^2$ addresses comprising two parts for storing, respectively, the number of short and of long lightning sensed in the quadrilateral; that, at a given time, a high-stability clock delivers, first, the code $CZ$ and, second, cyclic selection signals for the $Z$ zone memories; that, if $Y<(n-1/2)$, the selection signal $j$, present at that time, controls the selection of the memory $j$, whereas, if $Y>(n-1/2)$, it is the memory $j+1$ that is selected; and that the readout of the memory $j$, for example, and the transmission of the information to the ground are carried on when the writing is finished in the memory $j-1$.

Another characteristic of the invention is the fact that, when the orbit makes an angle greater than 10° with respect to the equator, a supplementary correction is made on the coordinates $X'$ and $Y'$ for obtaining the true coordinates $X$ and $Y$, said correction taking into account the earth rotation.

BRIEF DESCRIPTION OF THE DRAWING

Other objects, characteristics and advantages of the present invention will become apparent by reference to the following description taken in conjunction with the accompanying drawings, in which:

FIG. 4 represents a first perspective view of the earth and of the satellite;

FIG. 5 represents a second perspective view of the earth and of the satellite;

FIG. 7 is a block diagram of the electronic circuits in the satellite;

FIGS. 8a, 8b, 8c represent diagrams relative to elementary time signals and to the operation signals;

FIG. 9 is a detailed block diagram of circuit ND and mosaics PS of FIG. 7;

FIGS. 11 and 12 are detailed block diagrams of the discharge counting circuit;

FIGS. 13a to 13e represent a given number of diagrams relative to the writing operation in the zone memories;

FIG. 17 is a detailed block diagram of one possible embodiment of computer GC of FIG. 7.

DESCRIPTION OF THE PREFERRED EMBODIMENT

Figure 1A:
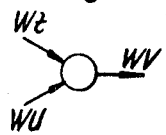
FIGS. 1a to 1m represent symbols of logical circuits used in FIGS. 9, 11, 12, 15, 16, 17 and 18.

Before describing the invention, there will be a brief discussion of the logic algebra notations which will be used herein in order to simplify the description of the logic operations. The subject has been treated extensively in numerous papers and in particular in the book "Logical Design of Digital Computers" by M. Phister (J. Wiley—publisher).

Thus, if a condition characterized by the presence of a signal is written $A$, the condition characterized by the absence of the said signal will be written $\overline{A}$.

These two conditions are linked by the well-known logical relation $A \times \overline{A} = 0$, in which the sign "$\times$" is the symbol of the coincidence logic function or "AND" function.

If a condition $C$ appears only when conditions $A$ and $B$ are simultaneously present, then $A \times B = C$ and this function may be carried out by means of a coincidence or AND circuit.

If a condition $C$ appears when at least one of two conditions $E$ and $F$ is present, then $E + F = C$ and this function is carried out by means of a mixing gate or OR circuit.

Since these AND and OR logical functions are commutative, associative and distributive, the following relations may be written:

$$A + B = B + A;$$
$$A \times (B + C) = A \times B + A \times C;$$
$$(A + B)(C + D) = A \times C + A \times D + B \times C + B \times D; \text{ etc.}$$

Referring to FIGS. 1a to 1m, the symbols used in the drawings will be described:

FIG. 1a represents a simple AND circuit.

Figure 1B:
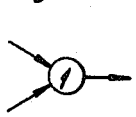

FIG. 1b represents a simple OR circuit.

Figure 1C:
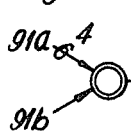

FIG. 1c represents a multiple AND circuit, which comprises, in the case of the example, four AND circuits each having a first input terminal connected to each one of the conductors 91a and a second input terminal connected to a common conductor 91b.

Figure 1D:
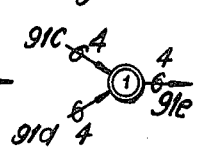

FIG. 1d represents a multiple OR circuit which comprises, in the case of the example, four OR circuits each having two input terminals 91c and 91d, and which delivers, over the four output conductors 91e, the same signals as those applied over either of said input terminals.

Figure 1E:
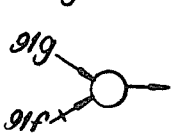

FIG. 1e represents an AND circuit having two input terminals 91f, 91g and which is blocked when a signal is applied over the input 91f.

Figure 1F:
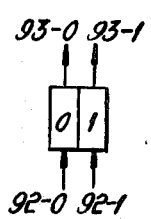

FIG. 1f represents a bistable circuit or "flip-flop" to which a control signal is applied over one of its input terminals 92–1 or 92–0 in order to set it in the 1 state or to reset it in the 0 state. A voltage of same polarity as that of the control signal is present, either on the output 93–1 when the flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{B1}$.

Figure 1G:

FIG. 1g represents a group of several conductors, five in the considered example. In some cases, when such a group must transmit the 1 and 0 informations originating, for example, from a register, the number of conductors is followed by: (1–0).

Figure 1H:
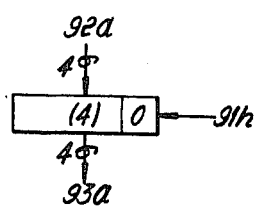

FIG. 1h represents a flip-flop register. In the case of the figure, it comprises four flip-flops having the 1 input terminals connected to the conductors of the group 92a and the 1 output terminals connected to the conductors of the group 93a. The digit "0", placed at one end of the register, means that this latter is cleared when a signal is applied on the conductor 91h. The bracketed digit which is placed inside the symbol indicates the capacity of the register.

Figure 1I:
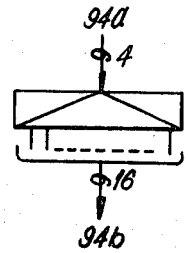

FIG. 1i represents a decoder which, in the case of the example, transforms a four-digit binary code group applied over the group of conductors 94a into a 1-out-of-16 codes, so that a signal appears on only one among the 16 conductors 94b for each one of the code groups applied at the input.

Figure 1J:
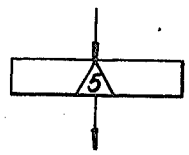

FIG. 1j represents a decoder which is so designed that it delivers an output signal only when the binary code group corresponding to the decimal number 5 is applied over its input terminals.

Figure 1K:
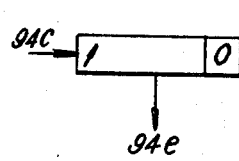
Figure 1L:
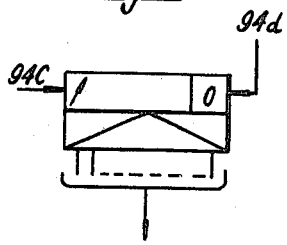

FIG. 1k represents a flip-flop counter which counts the pulses applied to its input terminal 94c and which is cleared by the application of a signal on its input 94d. The 1 outputs of the flip-flops are connected to the output conductors 94e.

FIG. 1C represents a selector constituted by the combination of a counter and of a decoder such as shown in FIG. 1k and 1i.

Figure 1M:
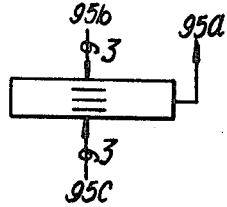

FIG. 1m represents a code comparator which delivers a signal over its output terminal 95a when the three-digit code groups applied over its terminals 95b and 95c are identical—are not identical.

In the course of the description frequently the reference character of a signal will be preceded by the letter "C" for identifying the binary code which, when decoded, gives said signal. Thus, "$CWx$" designates the code corresponding to the signal "$Wx$."

It should be noted that, in the different figures associated with the description, the electronic gates (AND, OR circuits) are not referenced. In fact, every gate is unambiguously identified, in the text, by the logical equation describing the function it performs and by the figure number, the reference of each applied elementary signal being placed, on said figure, near the corresponding input terminal. Thus, the AND circuit of FIG. 1a is defined by writing the logical equation $Wt \times Wu$ followed by the number of the figure.

There will be described, by way of nonlimitative example, a system for localizing light phenomena specially adapted to the counting of the lightning flashes occurring during thunderstorms.

Figure 2:
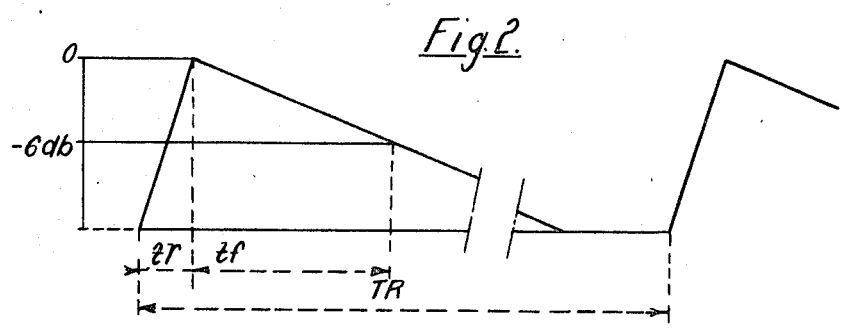
FIG. 2 represents the characteristics of the light discharges and of lightning.

As it is well known, each lightning is composed of one or several light discharges, the average characteristics of which are represented in FIG. 2. For each light discharge, its rise time $tr$ is equal to at least 5 $\mu$sec. (microseconds) and, on the average, 20 $\mu$sec.; its fall time $tf$ at $-6$db. (decibel) is equal to, on the average, 100 $\mu$sec. and, at its maximum, a few milliseconds (msec.); and its repetition period $TR$ is between some tens to some hundreds of milliseconds. A succession of discharges coming from the same zone of the troposphere characterizes a lightning and comprises as many as 20 discharges (four on an average) having a maximum duration of 500 msec. (10 percent of the lightning having a duration higher than 500 msec.).

The detected lightning has herein been classified as short lightning characterized by the logical condition $Ec$, or as long lightning characterized by the logical condition $En$.

If $To$ is called the time of occurrence of a first discharge in a zone, then, by way of a nonlimitative example, the following discrimination algorithm is employed: this discharge belongs to a short lightning if no new discharge appears in this zone in the time interval $(To+Tp)$ to $(To+Tq)$ and to a long lightning in the contrary case (it will be seen further on that it has been assumed that $Tp=128$ msec. and $Tq=512$ msec.).

In the system for localizing light phenomena according to the invention, the sensing is made by photoelectric mosaics placed in the satellite which is spin-stabilized with respect to an axis perpendicular to the orbit plane.

Figure 3:
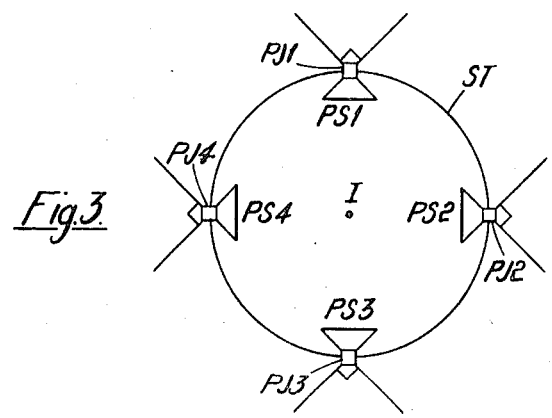
FIG. 3 represents a section of the satellite.

FIG. 3 represents a section of the satellite ST in a plane perpendicular to its rotation axis $I$. This figure shows four mosaics PS1 to PS4 regularly placed around the axis $I$ of satellite ST. $P$ associated with each of the mosaics is an aiming optical system PJ1, PJ2, PJ3, PJ4 having an aperture of 90° so that, for an altitude $H$, each mosaic, placed at the focus of the associated optics, covers on the ground a zone having a side greater than $2H$.

Each of these mosaics is divided into $n^2$ cells which enables the quantized measurement of two angles defining unambiguously the position of a point where a light phenomenon is detected.

This division, that follows particular laws as it will be pointed out hereinbelow, is carried out according to two rectangular coordinate axises and if, for example, $n=25$, each cell covers a sight field of $90°/25=3.6°$.

If it is assumed that the cells have a response from the near ultraviolet (about $0.4\mu$ (micron)) to the near infrared ($\approx 1.1 \mu$), they can be excited by many phenomena different from the light discharges corresponding to the lightning. Particularly, under the effect of daylight, the edge of a cloud or an earth-to-sea transition provokes important variations of the light level received by a cell.

Thus, if the satellite has a rotation of 60° per second (10 revolutions per minute) and for a sight field of 3.6°, a cell scans the edge of a cloud in 60 msec. producing, in daylight, a variations of its output signal. In the most unfavorable case, the rise (or fall) time of this signal is 60 msec., which means a fundamental frequency of 16.6 Hz.

Thus, it can be seen that by eliminating the low-frequency components of the signal spectrum, (for example, the frequencies lower than 250 Hz.) these stray signals are suppressed without modifying the signals having a short rise and fall times which characterize the discharges (see FIG. 2). From the slope of these rise and fall times, the high limit of the superior frequency band may be set at about 25 kHz.

The noise originating from the ambient brightness in the illuminated hemisphere also produces a stray signal the level of which varies, on one hand, because of the clouds and of the discontinuities and, on the other hand, because of the rotation of the satellite. A great part of the spectrum of this noise is eliminated by filtering the low frequencies, and an optical filter can also be added.

Concerning the design of the mosaic, very many types can be considered and, particularly, those that use thin films of semiconducting materials, silicon, for example, constituting photodiodes, the common cathodes and anodes of which represent the lines and the columns of the mosaic, respectively. These films are disposed on sheets with technological processes which are well known today.

Each of these lines and columns is connected to one terminal of a resistor, the other terminal of said resistor being grounded so that the currents delivered by the photodiodes are represented by voltages proportional to the power of the light signals.

FIG. 4 represents in perspective view the earth FR and the satellites ST after choosing, as an observation place, a point situated in space, on the right-hand portion of the figure.

The satellite ST is represented in a schematic way as a wheel and the lens PJ1 is shown on the periphery of the satellite. The vertical $IO$ passing through the center $I$ of the satellite and the center $O$ of the earth defines the subsatellite point $Sj$, the trajectory of which is the great circle $CS$ on the earth surface, the earth being temporarily assumed motionless to make the description easier.

The orbit plane $PO$ is defined, on either side of the point $Sj$, as the vertical plane, the intersection of which with the earth is the great circle $CS$.

The normal plane $PN$ is defined as the vertical plane that is orthogonal to the orbit plane and which contains, on one hand, the vertical $IO$ and, on the other hand, the rotation axis $U1, U2$ of the satellite ST. This plane intersects the earth surface according to a great circle $CN$.

The point $E$ represents the projection on the earth of a point of the troposphere where a light phenomenon appears, and the points $Sj$ and $E$ are on the same great circle $CD$.

Inasmuch as the satellite is at a known distance $H$ from the earth, it can be assumed, first, that, as it has been seen previously, the origin point of the light phenomenon and its projection on the earth at point $E$ are coincident and, second, that the lens associated with each mosaic, such as PJ1, is placed at the axis $I$ of the satellite. There can then be defined the following:

The line of sight $IE$; and

The direct sight triangle, the part of which exterior to the earth surface is the triangle $EIE''$, this triangle being drawn so that its plane is perpendicular to the orbit plane $PO$. This triangle is perfectly defined by the direct sight angle $Bj$ between its plane and the normal plane and by the lateral sight angle $Ax$ which is the apex angle $I$. Inversely, knowing these two angles enables the location of the position of the point $E$ on the earth, it being understood that this point is situated between the equatorial plane (the horizontal plane passing through the center $O$ of the earth) and the tangent plane at point $Sj$; and that, the distance $ISj$ (altitude $H$ of the satellite) is known and practically constant (satellite on a circular orbit).

In the satellite ST, there is defined a system of cartesian coordinates $IX1, IY1, IZ1$, the direction cosines of which are directed as shown in FIG. 4. It results that, in the case shown in FIG. 4, in which the point $E$ is situated in front of FIG. 4, the angle $Ax$ is positive and the angle $Bj$ is negative.

The quantized measurement of these angles $Ax$ and $Bj$ is made by means of the mosaics which are so divided that the division $Kij$ corresponds to a line of sight of quantized angular coordinates $(Ax)i, (Bj)j$. Each mosaic is a plane and, using its own system of coordinates $Fx, Fy$ (FIG. 6), it is divided into $n$ divisions along each axis, so that each division covers a sight field of $90°/n$ for each value $(Ax)i, (Bj)j$.

To determine the quantizing laws of a mosaic assumed to be horizontal, refer to FIG. 5 which is a perspective view of the satellite and of the earth showing one of the dihedrals formed by the planes $PN$ and $PO$, the intersection of said planes being the vertical line $ISj$.

In the cartesian coordinate system $IX1, IY1, IZ1$, the direct sight triangle is the hatched triangle $ele'$ perpendicular to the plane $PO$ with an apex angle $I$ having a value $Ax$, the angle $Bj$ being measured in the plane $PO$.

Consider first that the angle $Ax$ is constant and that there must be located the locus of the point of intersection $eo$ of the line of sight $IE$ with the horizontal plane $PH$ (containing the mosaic) when the angle $Bj$ varies, for example, due to the rotation of the satellite around its axis $U1, U2$. (When the mosaic is horizontal, this plane $PH$ is coincident with the focal plane of the lens). It is seen that this locus line, which makes a constant angle with the axis $U1, U2$ describes a cone when $Bj$ varies. For $Bj=0$, point $eo$ is coincident with the focus $F$ and, for $Bj=90$, this point goes to infinity and hence is rejected. It can be easily calculated that the locus of the point $eo$ is an hyperbola of vertex $F$ but, as $Bj$ is limited to $\pm 45°$, the point $eo$ is always a real point. For different values of the angle $Ax$, there is obtained a group of hyperbolas and, since the hyperbola formed when $Ax=0°$ is coincident with the axis $FY$ and the hyperbolas formed when $Ax=90°$ is coincident with the axis $FX$, the radius of curvature of these hyperbolas, where $Bj$ is constant, increases with $Ax$.

Because of the rotation of the satellite around the axis $U1, U2$, this measured value $Bj$ is not the exact value $By$ of the sight angle and as discussed hereinabove $By=Bj-Bo$.

For a given angle $Bj$, the satellite is considered as motionless and the locus of the point $eo$, on the plane $PH$, is a straight line parallel to the axis $FX$. For different angles $Bj$, the different straight lines obtained by variations of the value of the angle $Ax$ are more and more spaced when $Bj$ increases from a zero value.

Since the angle $Ax$ is the complement of the angle between the line of sight $Ie'$ and the axis $U1$ $U2$ of the satellite, the rotation of the satellite does not alter the value of said angle.

Figure 6:
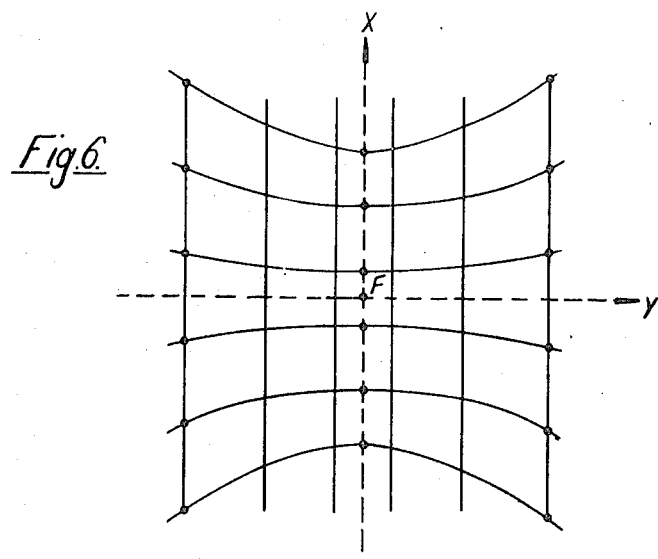
FIG. 6 represents the mode of division of the cells of a mosaic.

FIG. 6 represents the mosaic with its two families of curves, each case being constituted by a quadrilateral representing an equal value of angle $(Ax)i$ and $(Bj)j$ of the two families of curves have been correctly set up.

Now the polar coordinates $Ax, Bj, H$ are going to be transformed into the cartesian system $IX1, IY1, IZ1$, the origin of which is the axis $I$ of the satellite, and $Bj$ will be replaced by $By=Bj-Bo$ in order to eliminate the effect of the rotation of the satellite with regard to the vertical of the place the lightning occurred.

The direction cosines $a1, a2, b3$ on the three axis of this new coordinate system are shown in thick lines on FIG. 5 in which the angles $Ax$ and $Bj$ are negative and their values are:

$$\left. \begin{array}{l} \text{on the axis } IX1: a1 = \sin Ax \\ \text{on the axis } IY1: a2 = \cos Ax \times \sin By \\ \text{on the axis } IZ1: a3 = \cos Ax \times \cos By \end{array} \right\} \quad (1)$$

These two last values have been obtained by, first, projecting the direction cosine lined up with line of sight $Ie'$ on the line $Ie$ of the plane $PO$ (FIG. 5) and, second, by projecting this point on the axis $Iy1$ and $IZ1$.

In the cartesian coordinate system $OX2, OY2, OZ2$ shown in Fig. 4, having its origin at the center of the earth $O$, the direction cosines of the line of sight on the axises are $b1$, $b2$, $b3$. The direction cosines $b1$, $b2$, $b3$ of the coordinate system $OX2$, $OY2$, $OZ2$ are deduced from the direction cosines $a1$, $a2$, $a3$ of the coordinate system $IX1$, $IX1$, $IZ1$ by a simple translation along the vertical $IO$ with an amplitude of $IO$ which results in $b1=a1$
$b2=a2$
$b3=a3$ The point $E$ is defined by the intersection of the line of sight with the earth surface. If $R$ is the length of the earth radius and $H$ is the height of the satellite, the equation of the line of sight in the coordinate system $OX2$, $OY2$, $OZ2$ is:

$$\frac{x}{b1}=\frac{y}{b2}=\frac{z+(R+H)}{b3} \qquad (2)$$

There now will be a transformation into the geocentric coordinate system $\rho$, $\theta$, $\phi$, in which the equation of the sphere is $\rho^2=R^2$ and the angles $\theta$ and $\phi$ are defined in FIG. 4, it being understood that the values given to these represented angles are, respectively, negative and positive.

If the unit vector $W$ is considered to be lined up with the radius $OE$, its projection $OC$ on the horizontal plane $X2OY2$ is $\rho \sin \theta$ and there is obtained:

$x=\rho \sin \phi \cdot \cos \theta$
$y=\rho \sin \phi \cdot \sin \theta$
$z=\rho \cos \phi$
with $\rho=R$ The two first terms of the equation (2) give: $x/y=b1/b2$ or:
$\tan \theta = \cot Ax \cdot \sin By$ (3)
which can also be written:
$\theta = f1\ (Ax, By)$ (4)
The two last terms of the equation (2) give:

$$\frac{z+(R+H)}{y}=\frac{b3}{b2} \text{ or: } \cot By=\frac{\frac{H+R}{R}-\cos \varphi}{\sin \varphi \sin \theta}$$

By substituting for $\sin \theta$ its value obtained from equation (3) there is obtained an equation
$\phi = f2\ (Ax, By)$ (5)
that enables the calculation of the value of the angle $\phi$.

From the values $\theta$ and $\phi$ of the geocentric coordinates of the point $E$ this point can be localized, either by cartographic coordinates corresponding to a given projection system, or by geographic coordinates constituted, for example, by the latitude and the longitude. By way of a nonlimitative example, the localization system chosen in the present description enables the definition of the exact geographic coordinates of the point $E$ in the following way.

From the point $E$ there is drawn a great circle $CE$ orthogonal to the great circle $CS$ (FIG. 4) which intersects this circle at $E'$. The coordinates are then:
$Y3=\overline{SjE'}$
$X=\overline{EE'}$.

The ordinate $Y3$ is measured from the subsatellite point $Sj$ whereas it has been seen previously that the ordinate of the point $E$ is taken with respect to the origin point $SO$. The distance $Y4=\overline{SOSj}$ being the distance covered by the satellite in the time used to pass between the vertical of points $SO$ and $Sj$, the value of $\overline{SOE'}$ is easily calculated and is:
$\overline{SOE'}=Y=Y3-Y4$.

On the other hand, the earth zone where the greatest number of the thunderstorms occur is the equatorial zone that can be surveyed by a satellite with an equatorial or quasiequatorial orbit (maximum inclination 10°) for which the earth rotation practically occurs in the orbit plane. It is enough, in this case, to take into account the earth rotation and to correct the value of $Y4$ by a constant factor.

However, if it is desired to look over other zones of the surface of the earth with a satellite having an inclination greater than 10°, the values of $\theta$ and $\phi$ given by the equations (4) and (5) must also be corrected.

To determine the exact geographic coordinates $Y3$ and $X$, the right spherical triangle $ESjE'$ is used. In this triangle we have:
$\overline{SjE}=R\times\phi$
$\overline{SjE'}=Y3$
$\overline{EE'}=X$ On the other hand, it is seen in FIG. 4, that the plane of the angle $SjOC$ contains the great circle $CD$ and that the plane of the angle $SjOY2$ contains the great circle $CS$, so that the angle $Sj$ of the spheric triangle has the value $\overline{Sj}=(\pi/2)-\theta$.

The formula of spherical triangles enable the calculation of the coordinates $X$ and $Y3$:
$X=R \arcsin (\cos \theta \sin \phi)$
$Y3=R \arctan (\sin \theta \tan \phi)$.

It is seen that $X$ and $Y3$ are each functions of $\theta$ and $\phi$ which are themselves functions of $Ax$ and $By$ according to the equations (4) and (5).

Therefore, by calculation, tables can be set up that will give directly their values, which are:

$X=F1\ (Ax, By)$ (6)
$Y3=2\ (Ax, By)$ (7)

These coordinates are quantized in order to give the distances in number of quadrilaterals with respect to the origin quadrilateral centered on the point $SO$ (FIG. 4) and the distance $Y4$ is expressed in the same quantized unit.

The calculation of the coordinates $X$ and $Y$, from the angles $Ax$, $Bj$, $Bo$ measured by a mosaic, comprises only the following operations:
1. Calculation of the angle $By=Bj-Bo$;
2. Calculation of the coordinates $X$ and $Y3$ with the help of two-entry tables containing the functions symbolized by the equations (5) and (6).
3. Calculation of $Y=Y3-Y4$.

The calculation itself, therefore, comprises the execution of two subtractions and of a search in a couple of two-entry tables receiving, on their inputs, the same parameters.

Because of the symmetry of FIG. 4 in the four quadrants formed by the intersection of the planes $PO$ and $PN$ all the values of each angle $Ax$ and $By$ are given, in the tables, by only $n+1/2$ inputs, the sign of $X$ and $Y3$ being given by one of the angles $Ax$ and $By$.

The value of the ordinate $Y$ obtained by this calculation can be greater than $n-1/2$ which means that the point $E$ can be situated in one of the zones contiguous to that centered on the point $SO$. Therefore, for obtaining, in a zone, the exact ordinate value, when $Y>n-1/2$ (logical condition $S'$ FIG. 14), there must be made the operation $Yo=Y-(n-1/2)$ which will be called the ordinate correction. Moreover, as the parameters of the system have been chosen so that the mosaic covers on the ground a surface greater than that of a zone, it must be verified if $Yo<n-1/2$ and, in the contrary case (logical condition $V'$ FIG. 14), this light discharge is discarded.

The subtraction and comparison operations are made, in a well-known way, in the subtraction circuit that also performs the operations 1 and 3 hereabove mentioned.

FIG. 7 is a block diagram of the circuits that are on board the satellite for localizing the light phenomena occurring in the troposphere and comprises:

The block PS of electric mosaics comprising the mosaics PS1 to PS4;

The circuit ND for measuring and encoding the sight angle value;

The computer GC for calculating the geographic coordinates;

The discharge counting circuit DC;

The group of zone memories MZ;

The standard clock unit CU receiving signals from oscillator OS and from horizon sensor HS;

The high stability clock CS delivering the distance code $Cy2$ as well as the code $CZ$, the signal $Uo$ and the zone memory selection signals $t1$, $t2$, $t3$ which will be defined when describing FIG. 13 and receiving the signal $S$ from circuit DC;

The transmitter TR which transmits to the ground regularly spaced information; and The receiver RV that receives, at regular intervals, synchronizing information for clock CS.

The standard clock CU delivers, under the control of the oscillator OS, subcycle time signals $m1$ to $m128$ defining cycles lasting 4 milliseconds, each signal thus having a length of 31.2μsec.

Each subcycle signal is divided into eight basic time slots $c1$ to $c8$ which control the operations in the circuits GC and DC. As it is well known, the basic time slot signals are directly obtained from the signals delivered by the oscillator OS. The subcycle signals are obtained by applying, to a counter, an advance signal at each cycle of basic signals and this counter delivers the codes $Cm1$ to $Cm128$ that are then decoded to obtain the signals $m1$ to $m128$.

As it is represented on the diagrams of FIG. 8, the subcycle signals are grouped in order to establish:

The signals $tA$ and $tB$ (FIG. 8b) used for measuring and calculating the coordinates;

The signals $tC$ to $tG$ (FIG. 8c) used for discharge counting and the ordinate correction.

The Table I hereunder shows the durations of each of these signals and their use.

TABLE I

| Time | Duration | Operations |
|---|---|---|
| tA | m1 to m126 | Measure of the angles by the block of mosaics PS, and their encoding in the circuit ND. |
| tB | m127 and m128 | Calculation of the coordinates in the circuit GC. |
| tC | m1 to m100 | Cyclic reading of the lines 1 to 100 of the memory DC reserved to the lightnings being processed. |
| tD | m101 | Writing of the codes of a first discharge in one of the lines 1 to 100 of the memory DC. |
| tE | m102 to m106 | Cyclic read and write for the lines 102 to 106 of the memory DC reserved for ordinate correction. |
| tF | m107 to m109 | Execution of an ordinate correction in the circuit GC. |
| tG | m127 | Transfer of the exact coordinates of a lightning into the memory MZ and clearing. |

FIG. 9 is a detailed block diagram of mosaics PS and circuit ND. The block of mosaics PS is organized into a matrix of $n$ columns (abscissae $x1$ to $xn$) and $b=4n$ lines (ordinates $y1$ to $yb$), $n$ being an odd number. When the cell placed at the intersection of the column $i$ and the line $j$ is excited, a current passes through it and circulates into the associated conductors $xi, yj$. Each of these conductors is connected, in the circuit ND (FIG. 7), to an amplifier having a passband of 250 Hz.–25 kHz. The output signals of said amplifier control, at the time $tA$, when they are above a given threshold, the setting in 1 state of the first flip-flop in, respectively, the lateral sight angle register Gx (angle $Ax$) comprising $n$ flip-flops, and the direct sight angle register Gy (angle $Bj$) comprising $b$ flip-flops. This information is then translated into binary code by coders CRA and CRB which deliver codes $CAx$ and $CBj$ of the two sight angles.

In addition, horizon sensor HS (FIG. 7) delivers a pulse every time its line of sight is tangential to the earth surface. This information is processed in a well-known manner, and it gives the code $CBo$ of the position of a reference point on the surface of the satellite with respect to the vertical.

The codes $CAx$, $CBj$ and $CBo$ are applied, at time $tB$, to the computer GC which comprises the circuits enabling the different operations hereabove described to obtain the exact geographic coordinates, the codes of which are $CX$ and $CY$ (or $CYo$). As it has been seen these operations are subtractions and searches in the tables that contain the functions symbolized by the equations (6) and (7).

Computer GC is an arithmetic computer of well-known design and will not be described in detail. The speed of execution of the operations in this circuit depends on the type of circuits used and on their dissipation. It is understood, however, that, if all the operations for obtaining the codes $CX$ and $CY$ cannot be made during two subcycle times as is indicated in the Table I ($tB=m127$ and $m128$), the duration of $tB$ can be increased by reducing that of $tA$, or by reserving the times $m1$ to $m106$ and $m110$ to $m126$ of the next cycle to the time $tB$. The time period $m107$ to $m109$ will, however, remain reserved to the ordinate correction (time $tF$).

Figure 10:
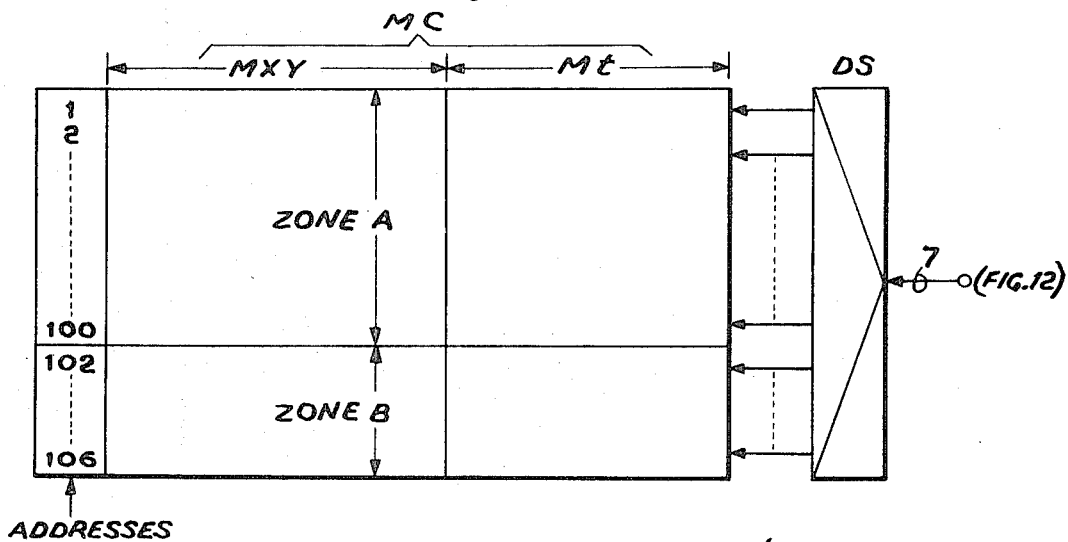
FIG. 10 illustrates the organization of memory MC of FIG. 11.

At the end of time $tB$, computer GC delivers the codes $CX$ and $CY$ of the coordinates, with respect to the origin point $SO$ (FIG. 4), of the quadrilateral in which the observed phenomenon has occurred. These codes are then transferred to circuit DC for storage in memory MC (FIG. 11). FIG. 10 illustrates the detailed organization of memory MC which is divided horizontally into two address zones:

Zone A (addresses 1 to 100): Discharge memory for measuring the duration of the lightning, and Zone B (addresses 101 to 106): Ordinate correction buffer.

Memory MC is also divided vertically into two parts:

Memory MXY for storing location codes $CX$, $CY$, and

Memory Mt for storing elapsed time codes in its zone A and lightning duration data in its zone B.

The addresses 1 to 106 are selected under the control of signals delivered by decoder DS. This selection is made synchronously or asynchronously under the control of codes applied to decoder DS as will be explained hereinafter during the description of FIG. 11.

Table II describes the different operations which are performed, once per cycle of 4 msec. and at times $tC$, $tD$, $tE$ by means of these synchronous and asynchronous selections in both zones of memory MC.

TABLE II

| | Time | Memory MXY | Memory Mt |
|---|---|---|---|
| Zone A | tC | Synchronous readout | |
| | | The non-free lines contain the codes CX-CY of discharge in course of processing. They are compared to new discharges codes sent by GC. The codes are rewritten except if the comparison yields: (a) A signal E characterizing a lightning. (b) A signal J′ characterizing a new discharge. | The free addresses contain a code zero. The non-free addresses contain an elapsed time code Ct. This code is increased by one unit and rewritten except if a signal E or J′ appears. |
| | tD | Asynchronous writing, in a free address and under the control of a signal J′, of the codes CX, CY of a new discharge. | Zero time code. |
| | tC | Asynchronous writing in a free address under the control of a signal E | |
| | | Writing of the codes CX, CY of a lightning. | Writing of the information. Ec or En characterizing the duration (short or long) of this lightning. |
| Zone B | tE | Controlled synchronous readout which is stopped when a non-free address is selected | |
| | | Codes CX, CY transferred to registers RSX, RSY. | Duration of lightning appearing as a signal Rc or Rn delivered by decoder DM. |

At time $tF$, the code $CY$ stored in register RSY (FIG. 11) is sent to computer GC for performing the ordinate correction and the code $CX$ is transferred into register REX (FIG. 11). The corrected code is sent back to circuit DC at the end of time $tF$ and stored in register REY (FIG. 11).

Lastly, at time $tG$, the exact coordinates which are stored in registers REX and REY (FIG. 11) are sent, together with the signal $Rc$ or $Rn$ to the zone memories MZ to select the corresponding address in one of these memories. The number of short or long lightning which is read in this address is increased by one unit according to whether there is a signal $Ec$ or $En$, then the number is rewritten in the same address.

As has just been seen, the informations supplied during time $tA$, by the block of mosaics PS, are stored in the registers Gx, Gy (FIG. 9) and are afterwards coded before being processed, during the time *tB*, by the arithmetic computer GC.

Among the information delivered by the block PS, the only valid ones are those covering a sight field of ±45° with respect to $Ax=Bj=0$, the other being considered as noise.

To eliminate this noise, there has been provided a scaled selection of the mosaic cells, as shown in FIG. 9, which groups the block of mosaics PS and circuit ND.

As it has been mentioned in the general description in connection with FIG. 7, there has been coupled to each output conductor of the block of mosaics PS, an amplifier which is not shown on FIG. 9 in order to simplify it.

For the line selection, there has been provided $b/p$ groups of $p$ lines, ($p$ being a submultiple of $n$ and $b=4n$) that are set into service when the AND-circuits Pg1 to Pg($b/p$) receive a signal $Bo$ (1) to $Bo(b/p)$ obtained by a particular decoding of the code $CBo$ generated from the data supplied by the horizon sensor HS (FIG. 7).

For the columns selection, each group of $n$ columns of a mosaic is controlled by one of the multiple AND-circuits Ph1 to Ph4 controlled by signals $Bo1$ to $Bo4$ also obtained from the code $CB$.

If, for example, the reference point on the satellite is the point $R$ (point for which $Bo=0$), the Table III gives the relations between the angles $Bo$ and the signals $Bo1$ to $Bo4$.

TABLE III

| Angle Bo | Column signal | Activated mosaics |
|---|---|---|
| 0°≤Bo<90° | Bo4–Bo1 | PS4–PS1. |
| 90°≤Bo<180° | Bo1–Bo2 | PS1–PS2. |
| 180°≤Bo<270° | Bo2–Bo3 | PS2–PS3. |
| 270°≤Bo<360° | Bo3–Bo4 | PS3–PS4. |

It is, therefore, seen that, at each time, the columns of two adjacent mosaics are activated.

The signals $Bo(1)$ to $Bo(b/p)$ applied to the groups of lines are obtained in a similar way and are grouped to control the activation, at each time, of $n+2p$ lines centered on both sides of the normal plane *PN* (FIG. 4).

The signals delivered by the AND-circuits Pg1 to Pg($b/p$) are applied to the longitudinal or direct sight angle register Gy. Those delivered by the AND-circuits Ph1 to Ph4 are mixed in the multiple OR-circuit Ph5 comprising $n$ output conductors in order that each of these conductors corresponds to a column of the mosaic block. These conductors are connected to the inputs of the lateral sight angle register Gx.

Thus, when a light phenomenon occurs, a flip-flop sets in the 1 state in each of these registers Gx and Gy, and all the other flip-flops must remain in the 0 state.

However, during time *tA*, the duration of which is slightly shorter than 4 microseconds, several discharges belonging to different lightning can occur. Because of the low value of their rise time *tr* (see FIG. 2) and as it follows from the measurements made on the earth concerning the frequency and the density of the lightnings, the probability for two discharges to occur simultaneously is very low. However, the registers are so designed that only the information on the location of the first lightning discharge received during a time *tA* can be registered. For this purpose, decoder Dx, coupled to register Gx, delivers a signal $D'1$ when no information is stored in the register, and a signal $D1=D'1 \times tA$ is applied to the AND-circuits Pg1 to Pg($b/p$) and Ph1 to Ph4, so that these circuits are blocked, on one hand, as soon as a light phenomenon is observed and, on the other hand, during time *tB*. This signal $D1$, characterizing the detection of a discharge by the mosaics controls the setting of flip-flop D2 in the 1 state. The signal $D2$ is sent to computer GC together with codes $CBj$, $CAx$ (see FIG. 7). Flip-flop D2 is reset by a signal $m128.c8$ (end of time *tB*). This information $D2$ means, at time *tB*, that a discharge has been detected, even if, said discharge occurred in the origin quadrilateral, $Ax=Bj=0$. At the end of the processing in computer GC, a supplementary digit, characterizing the condition D2, is added to the code $CX$.

Moreover, the same discharge can be detected by two contiguous cells of the mosaic and there has been provided a circuit arrangement such that when two contiguous flip-flops in either register are simultaneously in the 1 state, one of said flip-flops is reset in the 0 state.

The operation of the circuits associated with register Gy, FIG. 9, will now be described. The circuits associated with register Gx are similar and will not be described in detail.

The flip-flops Gy1 to Gyb of register Gy receive their control signals from the AND-circuits Pg1 to Pg($b/p$) and they are cleared by a signal Z generated at the end of the time *tB*.

To avoid the setting into the 1 state of two adjacent flip-flops, the AND-circuits PC1, PC2, PC3 . . . PCb are used. When two adjacent flip-flops, Gy1 and Gy2, for example, are simultaneously in the 1 state, the AND-circuit PC1 delivers a signal that is applied at the 0 inputs of the flip-flops Gy1 and Gy3, through the OR-circuits Pd1, Pb1, and Pb3.

It is, therefore, seen that, when two adjacent flip-flops are in the 1 state, the odd rank flip-flop is reset in the 0 state.

Before describing the counting circuit DC, it will be recalled (see Table I) that this circuit performs the following operations:

Storage of a first discharge and determination of the type of lightning during times *tD* and *tC*, by using the lines 1 to 100 of memory MC;

Storage of the characteristics of the lightning on the lines 102 to 106 of memory MC;

Transfer of the code $CY$ to the arithmetic circuit GC for the performance of the ordinate correction, this being made at time *tF*; and Transfer of the exact coordinates and the characteristics of the lightning to the group of zone memories MZ, this operation being made at time *tG*.

Figure 12:
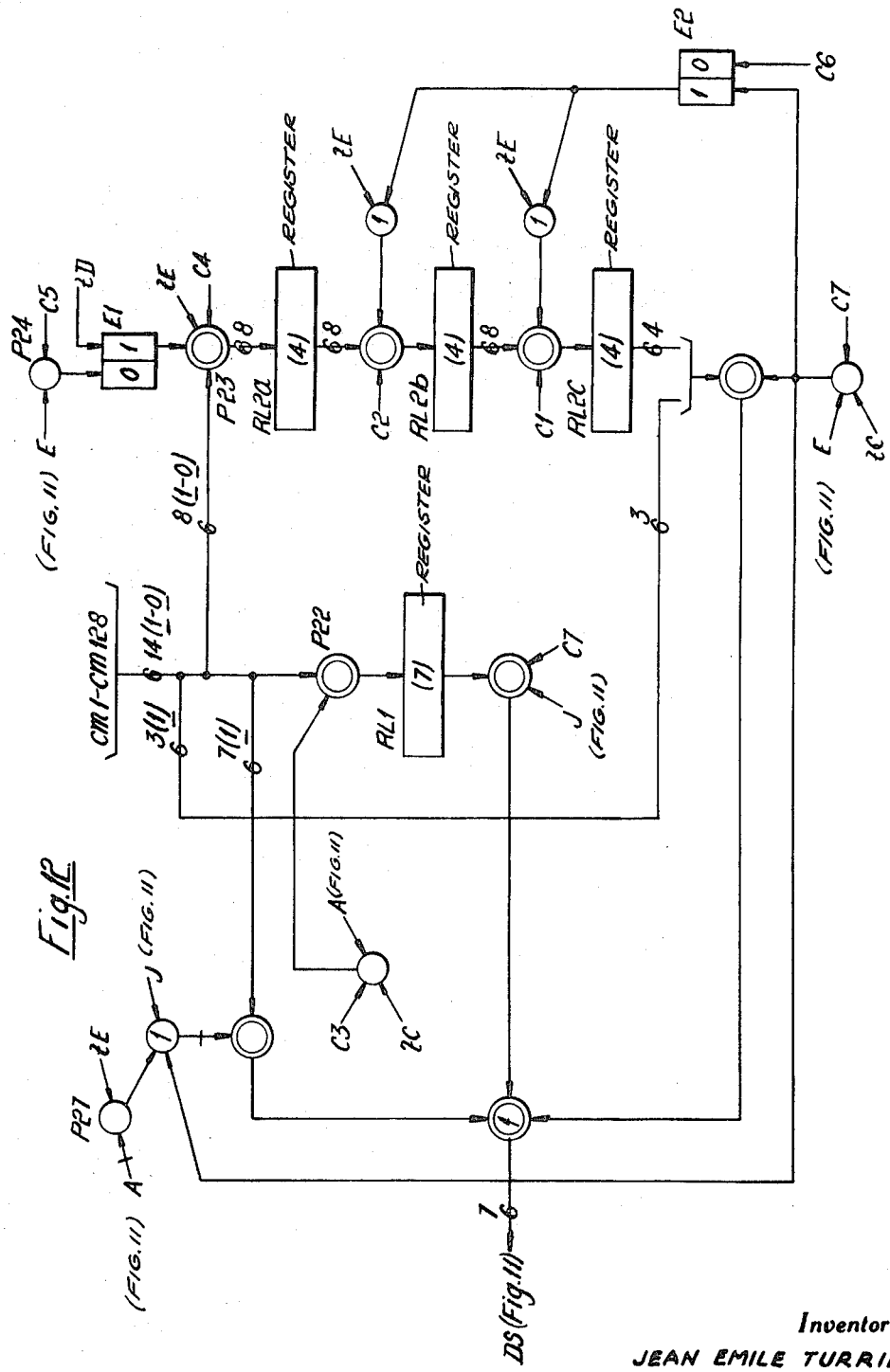

FIGS. 11 and 12 represent the detailed diagram of the circuit DC.

FIG. 11 shows:

Cyclic memory MC, shown in greater detail in FIG. 10, comprising the lines 1 to 100 selected, during time *tC*, by the time codes $Cm1$ to $Cm100$, and the lines 102 to 106 selected, during time *tE*, by the codes $Cm102$ to $Cm106$. This memory is divided in two parts:

a. The address memory MXY for storing the codes $CX$, $CY$ of the lightning being processed. If, for example, $n=25$, a coordinate $X$ or $Y$ is expressed by a four-digit code, plus one sign digit. It will be recalled that, since these numbers characterize the distance with respect to the origin quadrilateral centered on the origin point, the coordinates of this quadrilateral are $X=Y=0$. To avoid that the readout of these coordinates appears as the readout of a free line, it has been seen, when describing FIG. 9, that there is added, at the end of the computing in computer GC, a supplementary digit ($D2$) of value 1 to the code $CX$ of each discharge detected by the mosaics. An address of the memory MXY must therefore store a 11-digit number.

b. The auxiliary memory M*t* which stores either a seven-digit code characterizing the time elapsed since the reception of the first discharge (lines 1 to 100), or the information $Ec$ or $En$ (lines 102 to 106). As a matter of example, it has been chosen to describe a destructive readout memory, this readout operation occurring during the time slot *c1* of each subcycle time and the writing during the next time *c7*. However, it is to be understood that there could also be used a nondestructive readout memory in which each memory point would be constituted by a flip-flop achieved according to integrated circuit techniques.

The elapsed time unit *t* used in the memory M*t* is the duration of a cycle, or *t*=4 msec. and to make the decoding easier the following values have been chosen:

$Tp=32t=128$ msec. and $Tq=128t=512$ msec.

One of the lines 102 to 106 can also be selected asynchronously as will be seen further on.

FIG. 11 further shows:

Line selection decoder DS receiving the subcycle time codes from FIG. 12 and comprising 105 outputs for the selection of the lines 1 to 100 and 102 to 106 of memory MC.

Readout registers RSX, RSY and counter KS in which are stored the information readout at each subcycle time during the basic time slot $c1$;

Address code registers REX and REY provided for the storage of the codes $CX$ and $CY$ delivered by the computer GC (FIG. 7) at the end of time $tB$;

Comparator PR which compares the coordinate codes stored, on one hand, in the registers RSX, RSY and, on the other hand, in the registers REX, REY and delivers a signal $B$ if these codes are similar;

Decoder DA which delivers a signal $A$ if the line read in memory MC is free;

Decoder DM which delivers:

a. a signal $P$ if the code read at time $tC$, in the memory $Mt$, characterizes the time interval $To+32t-To+128t$ and a signal $Q$ if this code characterizes the time $To+128t$; and b. a signal $Rc$ or $Rn$ if the code read at $tE$ in this memory characterizes a short or a long lightning; and The flip-flop $J'$ set in the 1 state by a signal $tG$ from clock unit CU (FIG. 7) and in a 0 state by a signal $B$ comparator PB. We have, therefore, the condition $J'$ at the end of time $tC$ if the comparator PR has delivered no signal during this time.

FIG. 12 shows the free line search circuit and it comprises, particularly, register RL1 storing the code of a free line among the lines 1 to 100 and the registers RL2a, RL2b, RL2c, storing up to three codes of free lines among the lines 102 to 106 of memory MC.

The operation of this free line search circuit will now be described.

1. Free line search at time $tC$: As seen previously, the time $tC$ is reserved for the cyclic readout of the lines 1 to 100 of memory MC and, if at the next time $tD$, the condition $J=J' \times \bar{A} \times tD$ is present, (see FIG. 11) this means that it is a first discharge the codes of which must be registered in memory MC at this time $tD$. Therefore, there must be, for this operation, the address of a free line, an address that is searched for at time $tC$ and stored in the register RL1.

As seen in FIG. 12, the seven-digit codes $Cm1$ to $Cm128$ are supplied by clock CU (FIG. 7) on 14 conductors (seven conductors of information 1 and seven of information 0).

When at a given subcycle time of time $tC$, the corresponding line of the memory is free, the logical condition $A \times tC \times c3$ controls the storage of the selection code of this free line in the register RL1. If, afterwards, there is a second free line, its code takes the place of the preceding code in the register RL1 which, thus, contains, at time $tD$, the code of the last free line found in the memory MC.

2. Free line search at time $tE$: When the condition $E$ appears at a subcycle time of time $tC$ ($E=En+Ec$ (FIG. 11)), the codes $CX$, $CY$ of the lightning must be transferred, before the end of this subcycle time, on a free line of memory MC chosen among the lines 102 to 106. Since, during a cycle, the condition $E$ can appear several times, it is necessary to dispose of several free line codes. There has been chosen, as an example, to store in the registers RL2a, RL2b, RL2c, three free line codes which are obtained, at time $tE$ of the preceding cycle, during the cyclic readout of lines 102 to 106.

As described further on, the readout is blocked, at this time, as soon as the conditions $\bar{A}$ and $E$ are present, and the read codes (codes $CX$, $CY$) are not rewritten. The selection code of this line, therefore, constitutes a free line code for the next cycle and also one or several preceding codes $Cm$. The logical condition $E1 \times tE \times c4$ (FIG. 12), present until the time $c5$ of the subcycle time during the presence of the condition $E$, controls the transfer, in succession, of the free line codes in the register RL2a.

During this time $tE$, the codes are transferred from RL2b to RL2c (time slot $c1$) by the multiple AND and OR disposed therebetween and from RL2a to RL2b (time slot $c2$) by the multiple AND and OR disposed therebetween.

Since the times $m102$ to $m106$ may be represented by the four least significant digits of the subcycle time code, registers RL2a, RL2b, RL2c comprise only four flip-flops. For further utilization, the output of the register RL2c has added thereto the three most significant digits.

There will now be described the other operations that are performed in circuit DC. All the logical conditions that control these operations are set up by logical circuits that are represented in FIG. 11 except for those followed by a reference to another figure.

1. Cyclic selection of the lines 1 to 100 of the memory MC

When a couple of codes $CX$, $CY$ is transferred at time $tC$ in the registers RSX, RSY, there may be obtained different logical conditions as follows:

a. Logical condition $(\bar{A} \times \bar{B} \times \bar{Q} + B \times \bar{P}) \times tC$ (see block BC): the compared codes are different and we are not at $To+128t$, or the codes are similar, but we are in the time interval $To-To+32t$. This logical condition controls, at the time slot $c4$, the increase, by one unit, of the elapsed time code (advance signal applied to the counter KS);

b. Logical condition $B \times P \times tC$ (see block BC): the compared codes are identical and we are in the time interval $To+32t -To+128t$. According to the previously defined algorithm, a signal of long lightning $En$ is generated at time $c3$;

c. Logical condition $\bar{B} \times Q \times tC$ (see block BC): the compared codes are different and we are at $To+128t$. According to the algorithm, a short lightning signal $Ec$ is generated at time $c3$; and d. Logical condition $J' \times tD$: this logical condition characterizes, at the end of time $tC$, a first discharge if the registers REX, REY contain the codes $CX$, $CY$.

It will be noticed that, during a time $tC$, there can only be obtained a signal $Ec$, since the time interval $To+128t$ has a fixed duration and that only one new discharge is measured at each cycle. On the other hand, two or more signals $En$ may occur because of the long duration of the signal $P$, so that a lightning cannot be immediately stored in the group of zone memories MZ, said group being able to process only one lightning per cycle. For that reason the data concerning a lightning are temporarily stored in one of the lines 102 to 106 of memory MC.

2. Asynchronous selection of the lines 102 to 106 of memory MC

It has just been seen that during the cyclic selection, a signal $Ec$ or $En$ may be generated at time $C3$ so that a signal $E=Ec+En$ appears.

Before the end of this subcycle time, the following operations are then performed:

a. The logical condition $E \times tC \times c3$ (see block LR) controls the clearing of the counter KS;

b. The logical condition $En \times tC \times c4$ controls the advance by one unit of this counter. This counter displays the code zero for a short lightning and the code one for a long lightning;

c. The logical condition $E \times tC \times c7$ (FIG. 12) controls the blocking of the cyclic selection of the memory MC and enables the performance of the asynchronous selection of the free line, the address code of which is stored in register RL2c. The codes stored in the elements RSX, RSY, KS are, thus, transferred on the selected line (one of the lines 102 to 106); and d. The logical condition $tc \times c8$ (see block LR) then controls the setting of the flip-flops $Ec$ or $En$ the state 0. The elements RSX, RSY, KS are also cleared at time $c8$. On the other hand, the logical conditions $E \times tC$ or $c7$ controls the setting of flip-flop E2 (FIG. 12) into the 1 state which controls, at times $c1$ and $c2$ of the next subcycle time, the transfer of the other free line codes from RL2b to RL2c and from RL2a to RL2b.

3. Asynchronous selection of the lines 1 to 100 of the memory (Storage of a first discharge)

At the beginning of time $tD$, the condition $J'$ characterizes the fact that there has not been any identity of codes compared in the comparison made at time $tC$. The logical condition $J' \times tD \times c1$ controls the transfer of the information stored in the registers REX, REY into the registers RSX, RSY, so that a signal $\overline{A}$ appears if the codes $CX$, $CY$ of a first discharge enter in the registers REX, REY. The logical condition $J=J' \times \overline{A} \times tD$ controls in FIG. 12 the blocking of the transfer of the code $Cm101$ to the decoder DS and the asynchronous selection, at $c7$ (FIG. 12), of the code of the free memory line which is stored in the register RL1. At $c8$, due to the logic of block LR (FIG. 11), the registers RSX, RSY, REX, REY are cleared by $Za$ and $Zb$.

4. Cyclic selection of the lines 102 to 106 of memory MC

During the time $tE$, the lines 102 to 106 are read in a cyclic way until the condition $\overline{A} \times tE$ appears which blocks this operation (FIG. 12).

In this case, the output registers RSX, RSY of the memory contain codes $CX$, $CY$ and the decoder DM delivers a signal $Rc$ or $Rn$ which controls the generation of a signal $E$ ($E=Rc+Rn$).

5. Ordinate correction and transfer of the true ordinates into memory MZ

At the beginning of time $tF$, the logical condition $tF \times c1$ controls the transfer of the code $CY$ to the arithmetic circuit GC and the transfer of the code $CX$ into the register REX. At the end of time $tF$, the true value of the ordinate ($Y$ or $Yo$, as the case may be) is transmitted from the computer GC to the register REY along with a signal which is registered in the flip-flop S (logical condition $S$) if $Y>(b-1)/2$ and a signal which is registered in the flip-flop V (logical condition $V$) if $Yo>(b-1)2$.

The operations relative to a given lightning terminate at time $tG$ for the logical condition $E \times \overline{V} \times tG$ which controls the transfer of the codes $CX$, $CY$ (or $CYo$) and of the signals $Rc$ or $Rn$ to the memory group MZ. If this condition is not fulfilled because of the presence of a signal $V$, there is no transfer and this information is suppressed at $c8$.

The organization of the zone memory group MZ (FIG. 7) which comprises several zone memories each covering a zone of $2H \times 2H$ km. divided into $n^2$ quadrilaterals will now be described with reference to FIG. 16.

Figure 16:
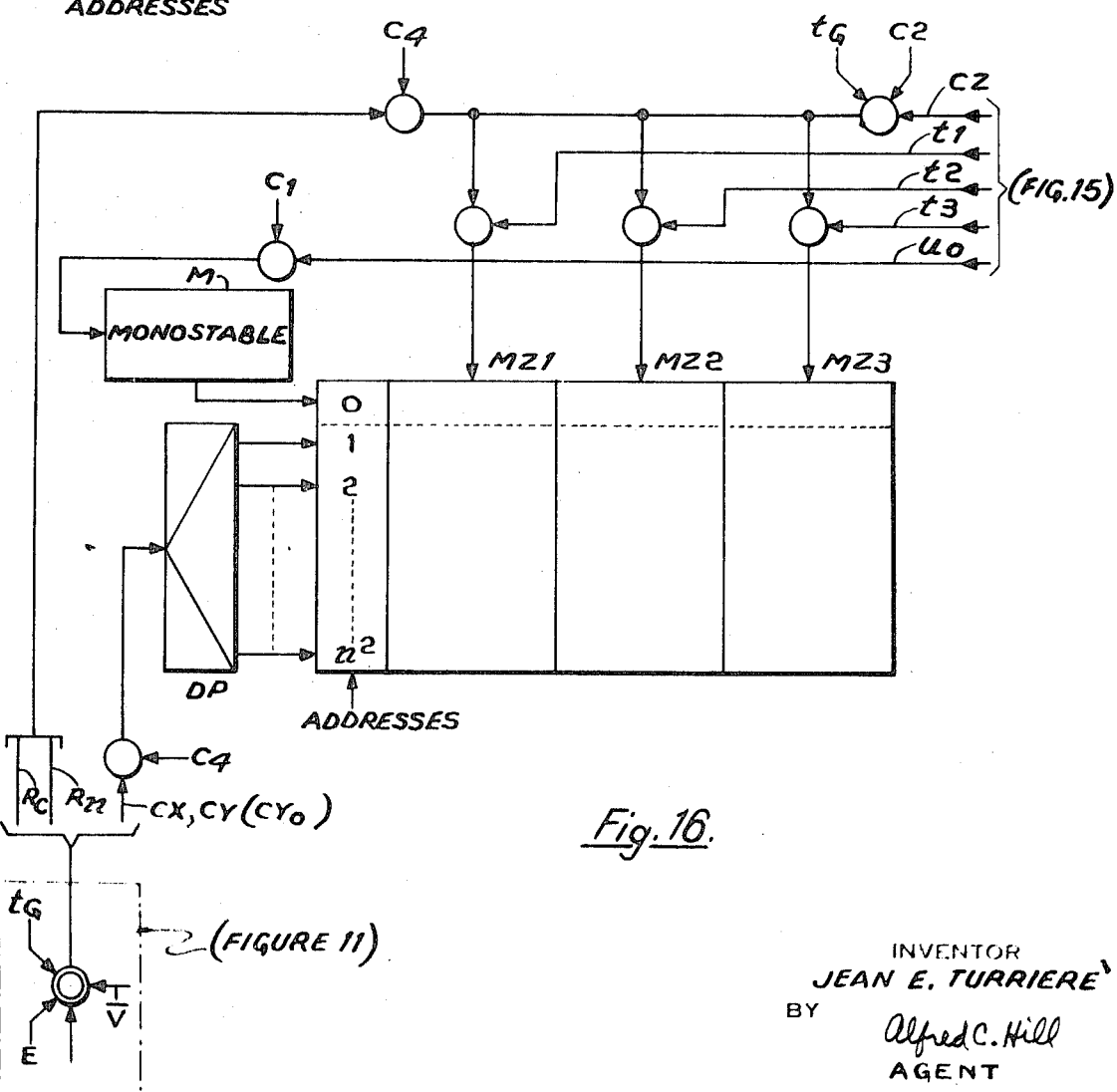
FIG. 16 is a block diagram of zone memories MZ of FIG. 7.
Figure 15:
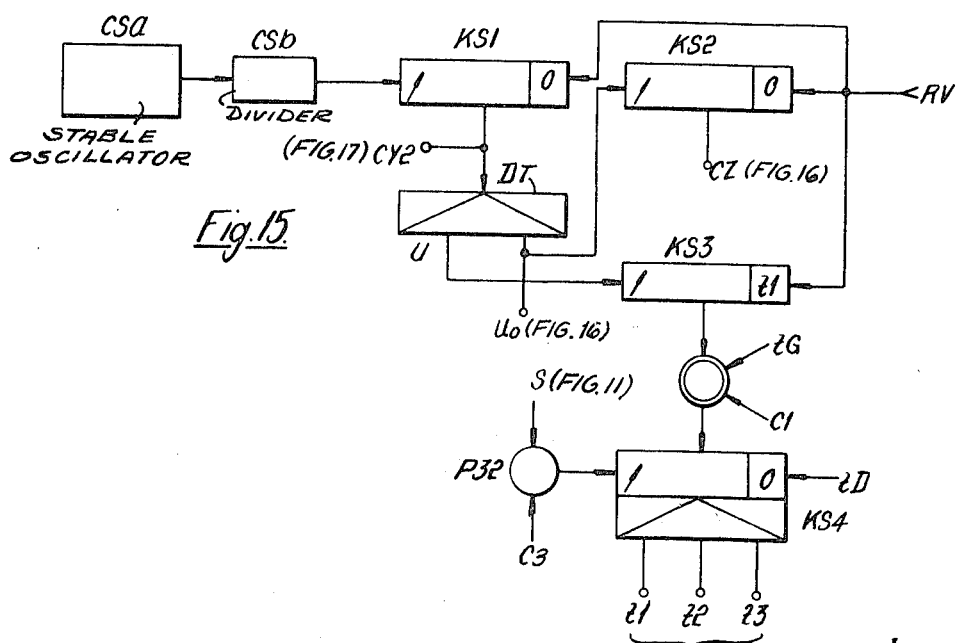
FIG. 15 represents the detailed diagram of the clock CS.

Referring to FIG. 16, memory MZ includes memories MZ1, MZ2, MZ3 each having an address zero for storing the zone code $CZ$ plus $n^2$ addresses corresponding to the $n^2$ quadrilaterals of each zone. The write address selection for these latter addresses is made under the control of decoder DP to which are applied, at time $tG.c4$, the codes $CX$, $CY$ ($CYo$) stored at that time $tG$ in registers REX, REY of circuit DC (FIG. 11). The write address selection for the address zero is made by a signal delivered by monostable M during times $c1$ and $c2$ under the control of signal $Uo$ originating from decoder DT (FIG. 15). The information to be stored in these memories are:

code $CZ$ for the logical condition $tG.c2$; and the lightning duration $Rc$ or $Rn$ for the logical condition $tG.c4$ (the condition $tG$ is applied to the multiple AND output gate, FIG. 11)

The selection of memories MZ1, MZ2, MZ3 is controlled by signals $t1$, $t2$, $t3$ (selector KS4, FIG. 15). It should be noted that the output signal of selector KS4 characterizes, between times $c1$ and $c3$, the zone which is flown over by the satellite ST and that it can be modified by one unit at time $c3$ (gate P32, FIG. 15) if a signal $S$ is present. Therefore, code $CZ$ is sent to the address zero at time $c2$ before the modification.

Each zone memory therefore comprises $n^2$ addresses selected for writing by the decoding of the codes $CX$ and $CY$ (or $CYo$), plus one address in which is stored a code $CZ$ giving the distance of the satellite with respect to a ground reference point. This reference point is a point on the earth surface with well-known geographic coordinates and with respect to which is measured the number of zones the satellite has passed through. On the other hand, it will be recalled that the origin point was defined as the point on the earth surface which corresponds to the center of a zone ZO, this point being coincident with the subsatellite point $SO$ at time $tO$ (see FIG. 13$a$).

The time $Tz$ during which the subsatellite point travels from this point $SO$ to the point $Sp$ which coincides with the center of the adjacent zone ZP defines exactly the time interval reserved for the writing in a zone memory, since, after the ordinate correction, the processing of the information $X$ and $Y$ has been limited to those having a value which is not higher than $|(n-1)/2|$.

It will not be determined, in relation with FIGS. 13$a$ to 13$d$, the number of zone memories that is necessary. It must be noted that the surface covered by the mosaics moves in a continuous way towards the left as shown in FIGS. 13$b$ to 13$d$, the time taken to cross a quadrilateral being referenced $E$.

At time $tO$, when satellite ST is over the origin point of the zone ZO, all the information is stored in a first memory MZ1. Then, as soon as satellite ST is over the quadrilateral contiguous to the origin quadrilateral (time $tO+E$, FIG. 13$b$), information to be stored in the contiguous memory MZ2 can be received. Between that time and time $tO+TZ-E$ (FIG. 13$c$) information can be stored in either memory MZ1 or MZ2. At time $tP=tO+TZ$, all the information is stored in MZ2 and, until time $tq=tP+TZ-E=TO+2TZ-E$, information which must be stored in memory MZ2 is still received. The time during which information can be in a zone memory is, therefore, equal to $2TZ$.

If it is established that a memory can only be read after the end of the writing, the minimum number of zone memories will be three if the readout duration is $TZ$, four if it is $2TZ$, and so on.

However, the readout can be started before the end of the writing because of the continuous leftward movement of the mosaics on satellite ST as represented in FIGS. 13$a$–13$d$. The minimum number of zone memories is then reduced to two.

For an altitude $H=1,250$ km. of the satellite, $TZ \approx 400$ seconds whereas the stations for facsimile reception for the information transmitted by the satellite according to the APT system process a picture corresponding to the definition of the system according to the invention in about 200 seconds. Thus, it is seen that, in the case hereabove considered, there is provided more than the necessary time to carry on the transmission.

As it has been seen, when describing the operations of computer GC, there can be substituted for the ordinate $Y$, measured with respect to the point $SO$ (zone ZO), a corrected ordinate $Yo$, measured with respect to the point $Sp$ (zone ZP). FIGS. 13$a$ to 13$d$ enable a determination of the calculations to be done to obtain the value of the ordinate in the zone to which it belongs and the corresponding operations are summed up in the organigram of FIG. 14. It is seen that the ordinate code is not modified if $|Y|<(n-1)/2$. In the contrary case, a signal $S'$ is generated and $Yo$ is calculated. If $|Yo|>(n-1)/2$, a signal $V'$ is generated, the utilization of these signals having been described in connection with FIG. 11. It can also be seen in FIGS. 13$a$ to 13$d$, that the phenomenon has occurred in the zone ZO if there is a signal $\overline{S}$ and in the next zone ZP if there is a signal $S$.

FIG. 15 represents the detailed diagram of the clock CS of FIG. 7 which comprises a high-stability oscillator CS$a$ associated with a block of dividers CS$b$ feeding the counter KS1 which delivers the code $CY2$. The frequency of the advance signals applied to this counter is chosen in order that the code it shows represents the distance $Y2$ (eventually corrected for the earth rotation) and it is cleared at the end of each time interval $TZ$. Decoder DT that is associated therewith then delivers a signal $Uo$ which controls the advance by one position of the counter KS2 which shows the number $Z$ of zone gone through from the ground reference point. Decoder DT also delivers a signal $U$ characterizing half of the distance between $SO$ and $SP$ (FIG. 13$a$), said signal being applied to counter KS3. This counter, which has a capacity of three digits, delivers cyclically, the codes $Ct1$, $Ct2$, $Ct3$. When the logical condition $tG \times c1$ is set up, the code stored in this counter is transferred to the selector KS4 which delivers the corresponding decoded signals $t1$, $t2$, $t3$. As it can be seen in FIG. 13e, each of these signals corresponds exactly to the time the satellite flies over the associated zone, the signal $t1$ corresponding to MZ1, the signal $t2$ to MZ2 and the signal $t3$ to MZ3.

As previously seen, the logical condition $S$, transmitted at time $tG$ to clock CS, means that the observed phenomenon occurs in the zone ZO and, therefore, the signal $t1$ delivered at this time by selector KS4 can be used. On the other hand, if the condition $\bar{S}$ exists the phenomenon takes place in the zone ZP. The condition $S \times c3$ (AND-circuit P32) then controls the advance by one unit of the selector KS4 in order that the next memory can be selected.

The counters KS1, KS2 are cleared under the control of a signal received from the ground and detected by receiver RV, and the counter KS3 is set in position $t1$ by the same signal. Knowing the geographic coordinates of the transmitter and if the operation takes place when the satellite passes at the vertical, the code CZ delivered by counter KS2 gives at any time the distance between the origin point on the ground and the satellite. The selector KS4 is cleared by the signal $tD$.

By a way of a nonlimiting example, computer GC with wired logic control will be described.

FIG. 17 illustrates in block diagram form computer GC which comprises:

The input control circuit ICC;

The input/output register unit IOR;

The multiplane permanent (or semipermanent) memory MTB constituting the tables wherein are stored the values of CX and CY1. The readout is controlled by gate Ga and is performed in one basic time slot;

The subtracter unit SU controlled by gate Gb; and

CBy. The word selection is controlled by the gate Ga, at time $tB.m127$. $(c5+c7)$ and uses:

The register R1 wherein is stored the code CBy. This code selects, in all planes by decoder DC1, the pair of addresses reserved to one code CBy.

The flip-flop W which is set in the 1 state at time $c6$ and reset in the 0 state at time $c8$. In the 1 (0) state, the odd (even) address of a pair of addresses is selected.

The register R2 wherein is stored the code CAx. This code selects one plane out of $j$ by connecting the output conductors of said plane to the memory output bus $Bm$ by means of decoder DC2.

Figure 14:
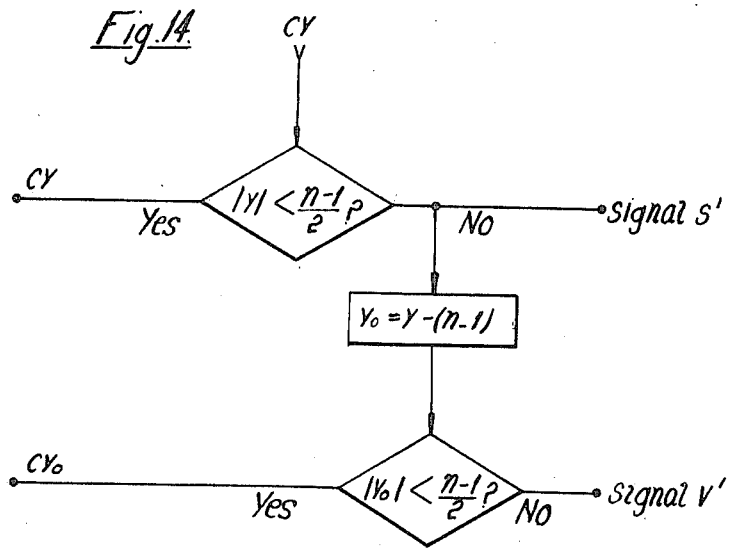
FIG. 14 represents the organigram of the ordinate correction.

The operation of computer GC comprises three different phases:

1. Computation of $X$ and $Y1$: at time $tB.127$: in a first phase, the value of the angle $By$ is calculated (code CBY). In the second phase the value of the coordinates $X$ and $Y1$ (codes CX and CY1) are extracted from the memory MTB.
2. Ordinate modification at time $tB.128$: The true value of the ordinate $Y$ (code CY) is calculated as $Y=Y1-Y2$.
3. Ordinate correction at time $tF.107$: The operations described in relation with FIG. 14 are performed in subtracter unit SU.

The sequence of the operations performed in computer GC is described in Table IV. The Table V gives the meaning of the symbols used in Table IV.

TABLE V

| Symbol | Meaning |
|---|---|
| CBj (Tf) R1 | The code CBj is transferred in the register R1. |
| CY1/R1 | The content of the register R1 is the code CY1. |
| P→S'(Tf)DC | The signal P controls the transfer. |
| j=$\frac{n+1}{2}$ | Code of the number $\frac{n+1}{2}$. |
| Cj |  |
| C2j | Code of the number $n+1$. |

TABLE IV

| Phase | Time | Input | Output | Result |
|---|---|---|---|---|
| 1 | tB | m127.C1 — CBj(Tf)R1; CBo(Tf)R2 | | |
|  |  | m127.C2 | CBy(Tf)R1 | Angle By. |
|  |  | m127.C4 — CAx(Tf)R2; CBy/R1 | | |
|  |  | m127.C5 | CX(Tf)REX | Abcissa X. |
|  |  | m127.C7 | CY1(Tf)R1 | |
| 2 |  | m128.C1 — CY1/R1; CY2(Tf)R2 | | |
|  |  | m128.C2 | CY(Tf)REY | Ordinate Y. |
| 3 | tF | m107.C1 — CY/RSY(Tf)R1, Cj(Tf)R2 | P → S'(Tf)DC / N → CY(Tf) REY. | Correction proceeds. End of correction. |
|  |  | m107.C3 — CY/R1, C2j(Tf)R2 | | |
|  |  | m107.C4 | CYo(Tf)R1 | |
|  |  | m107.C5 — CYo/R1, Cj(Tf)R2 | P → V'(Tf)DC / N → Cyo(Tf)- REY. | Rejected lightning. End of correction. |
|  |  | m107.C6 | | |

The output control circuit OCC.

Subtracter unit SU is a well-known device operating on the complements to $2^n$ so that the operands are written in absolute values plus a sign bit whose value appears, at the output, as a signal P (positive number) or N (negative number). Such a unit is described in the book "Computer Handbook" of Huskey and Korn (MacGraw Hill—1962), chapter 15. The complete subtraction is performed in one basic time slot.

Figure 18:
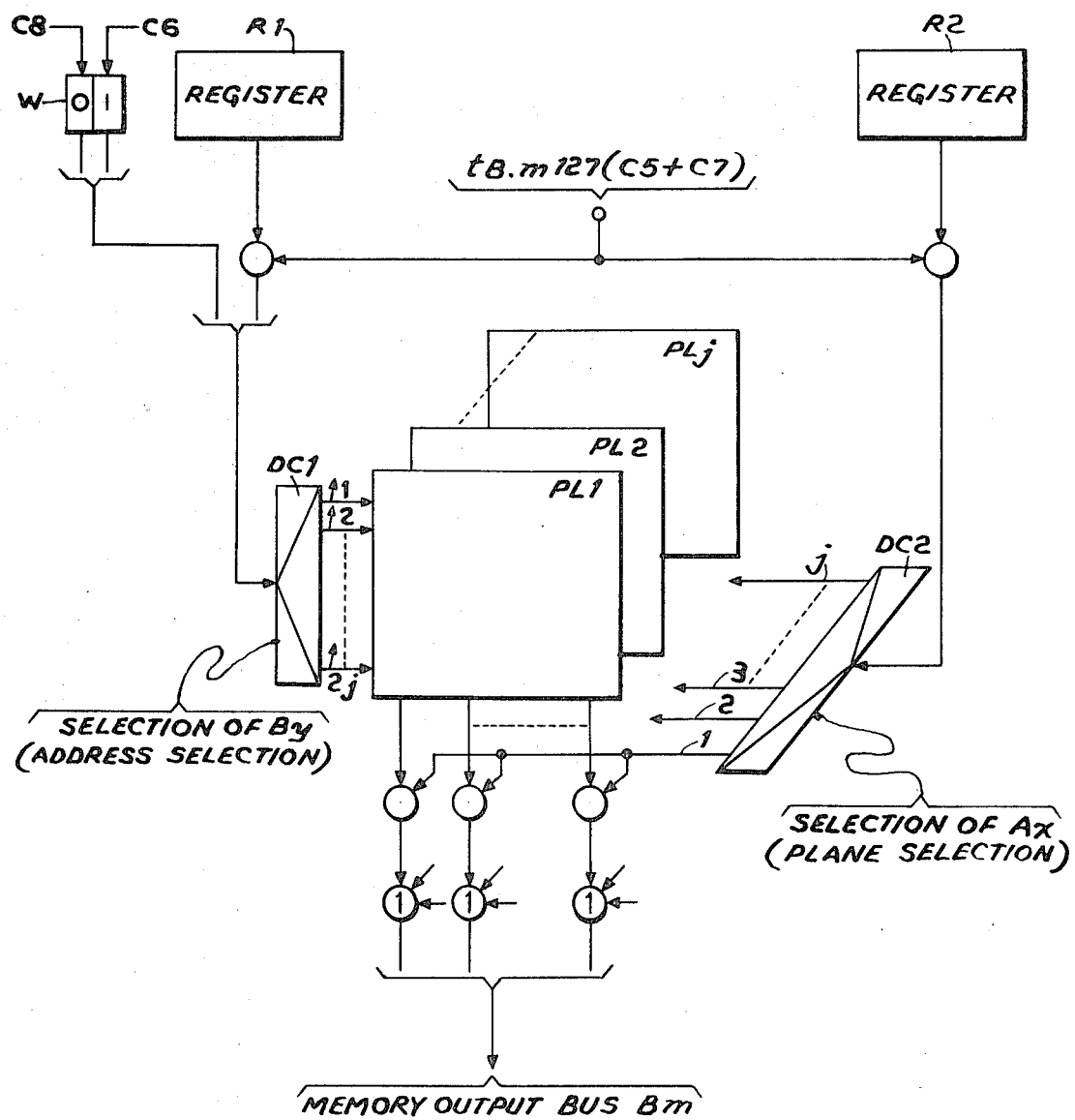
FIG. 18 is a detailed block diagram of memory MTB of FIG. 17.

FIG. 18 illustrates in block diagram form the detailed diagram of memory MTB which comprises $j$ planes PL1, PL2 . . . PLj (with $j=(n+1)/2$). Each memory plane comprises two interleaved sets of $j$ addresses wherein are stored the values, respectively, of CX and of CY1.

Each plane constitutes a word-organized table for one value of the code CAx and each pair of addresses stores two $m$-bit words ($2^m \leq (n+1)/2$) corresponding to one value of the code Although the principles of the present invention have been described in connection with a specific embodiment, and concern particularly light phenomena, it is to be clearly understood that it is not limited to said example and that it is capable of other variations or modifications within the scope of the invention, as for example, the detection and localization of electromagnetic emissions other than light emissions, of a natural or artificial origin, as long as these emissions occur in the required conditions and are observed with the help of suitable transducers.

I claim:

1. A thunderstorm observation satellite for determining the location of lightning comprising on board said satellite;

first means to detect said lightning and provide quantized information about the value of two angles to enable determining unambiguously the position of said detected lightning projected on the earth surface;
second means coupled to said first means to process and store said quantized information; and
third means coupled to said second means to transmit said stored quantized information to ground stations at regular intervals;
said second means including
fourth means to determine and store the duration of said detected lightning.

2. A satellite according to claim 1, wherein
said fourth means includes
a first cyclic memory means to store for a first given time the quantized position of one said lightning,
fifth means coupled to said first memory means to compare the quantized position of said one said lightning to the quantized positions of all said lightning stored in said first memory means to produce an identity signal if said one said lightning has the same quantized position as that of one of said all said lightning, and
sixth means coupled to said fifth means to generate a first signal if said identity signal has a first given delay relative to said first given time and a second signal if said identity signal has a second given delay different than said first given delay relative to said first given time.

3. A satellite according to claim 2, wherein
said second means further includes
seventh means for processing said information concerning said lightning when one of said first and second signal have been generated having
second cyclic memory means coupled to said first cyclic memory means,
eighth means coupled to said second memory means to control asynchronously the readout of said information therefrom,
ninth means coupled to said second memory means and said eighth means to block said readout as soon as a set of said information has been extracted, and
tenth means coupled to said second memory means to produce a first control signal when said lightning occurs in a zone on said earth surface over which said satellite is located and a second control signal when said lightning occurs in the next adjacent zone on said earth surface.

4. A satellite according to claim 3, wherein
said first means defines on the earth surface a plurality of zones each of which are divided into $n \times n$ quadrilaterals, where $n$ is an integer greater than one; and
said second means further includes
a plurality of zone memories each corresponding to a different one of said zones on said earth surface selected in time sequence according to the displacement of said satellite;
each of said memories including $n \times n$ addresses reserved to the $n \times n$ quadrilaterals of one of said zone on said earth surface, and an additional address for storing the number of said zones which said satellite has flown over from a given reference point on said earth surface,
each of said $n \times n$ addresses including one part to store the number of said first signal and second part to store the number of said second signal.

5. A satellite according to claim 4, further including
eleventh means to transfer said information from said seventh means to the appropriate one of said zone memories and for selecting the appropriate address in said one of said zone memories when said first control signal is present and in the next one of said zone memories when said second control signal is present.

6. A satellite according to claim 5, further including
twelfth means coupled to said eleventh means to increase by one unit the number stored in said one part of said appropriate address if said first signal is present and to increase by one unit the number stored in said second part of said appropriate address if said second signal is present.

7. A satellite according to claim 6, wherein
said first means include
a plurality of $n \times n$ matrices of photosensitive means, where $n$ is an integer greater than one.

* * * * *